(12) United States Patent
Sanchez Basualdo et al.

(10) Patent No.: US 12,221,058 B1
(45) Date of Patent: Feb. 11, 2025

(54) BUCKLE APPARATUS FOR AN OCCUPANT RESTRAINT SYSTEM

(71) Applicant: Volvo Car Corporation, Gothenburg (SE)

(72) Inventors: Egoi Sanchez Basualdo, Gothenburg (SE); Konstantinos Chatziioannou, Gothenburg (SE); Xingyun Yang, Gothenburg (SE); Ashok Chaitanya Koppisetty, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/393,882

(22) Filed: Dec. 22, 2023

(51) Int. Cl.
*B60R 22/32* (2006.01)
*B60R 22/18* (2006.01)

(52) U.S. Cl.
CPC ............ *B60R 22/321* (2013.01); *B60R 22/18* (2013.01); *B60R 2022/1806* (2013.01)

(58) Field of Classification Search
CPC .................. B60R 22/321; B60R 22/18; B60R 2022/1806
See application file for complete search history.

(56) References Cited

U.S. PATENT DOCUMENTS

| | | | | |
|---|---|---|---|---|
| 4,393,557 A | * | 7/1983 | Schmidt ............. | A44B 11/2523 24/643 |
| 5,075,937 A | * | 12/1991 | Schneider .......... | A44B 11/2523 24/641 |
| 6,708,380 B2 | * | 3/2004 | Schneider ............. | B60R 22/023 280/808 |
| 8,240,012 B2 | * | 8/2012 | Walega ................... | B60R 22/32 24/603 |
| 2015/0048609 A1 | * | 2/2015 | Schramm .............. | B60R 22/321 280/806 |

* cited by examiner

*Primary Examiner* — Faye M Fleming
(74) *Attorney, Agent, or Firm* — Clements Bernard Walker; Christopher L. Bernard; Devin Cummins

(57) ABSTRACT

A buckle apparatus for a seat of a vehicle and associated system and method. The buckle apparatus includes a locking mechanism and a retention mechanism arranged within a casing. The locking mechanism is configured to operably engage with a latch coupled to a seat belt webbing of the vehicle such that, in a locked mode, the latch is secured within an insertion slot defined in the casing. In an unlocked mode, locking mechanism is configured such that the latch is removable from the insertion slot of the casing. The retention mechanism is operable with the latch such that, in a retention mode, the retention mechanism is configured to cause the latch to be retained within the insertion slot of the casing when a withdrawal force applied to the latch is less than a predetermined value.

20 Claims, 11 Drawing Sheets

BUCKLE APPARATUS FOR AN OCCUPANT RESTRAINT SYSTEM

TECHNICAL FIELD

The present disclosure is generally directed to the transportation field. More particularly, the present disclosure relates to vehicle restraint systems and associated vehicle seat belt buckle apparatuses.

BACKGROUND

A conventional seat belt typically includes a lap belt that, in use, traverses the waist of a vehicle occupant from an anchor point on one side of a vehicle seat to a buckle latch member and associated buckle receptacle device on the opposite side of the vehicle seat. The lap belt then continues through the buckle latch member as a shoulder belt back across the chest and shoulder of the vehicle occupant and engages a routing device and/or retraction/tensioning device coupled to a pillar, such as the B-pillar in the automotive context, of the body of the vehicle, adjacent to the heat rest of the vehicle seat and head of the vehicle occupant, on the same side of the vehicle seat as the anchor point. Alternatively, the lap belt terminates at the buckle latch member, to which the shoulder belt is also coupled. This retraction/tensioning device can be disposed on or within the pillar, or at an intermediate point or the base of the pillar (with the routing device then disposed adjacent to the heat rest of the vehicle seat and head of the vehicle occupant). The retraction/tensioning device serves to spool out and take up belt material when the seat belt is fastened or removed. Optionally, the retraction/tensioning device can include a mechanical or explosive pre-tensioning device that snugs the seat belt against the torso of the vehicle occupant, and the torso of the vehicle occupant against the seat back, in the event of a substantial acceleration/deceleration, braking event, and/or impact, such that the seat belt can then apply a restraint force against the torso of the vehicle occupant without causing a seat belt injury. Ultimately, the lap belt applies a restraint force against the waist of the vehicle occupant and the shoulder belt applies a restraint force against the torso of the vehicle occupant when the retraction/tensioning device is limited or locks, holding the vehicle occupant securely against the seat bottom and seat back, respectively, during the braking and/or impact event. Although other configurations are possible, most conventional seat belts operate in a similar manner.

Many occupants are capable to or desire to manually spool out the seat belt webbing across his/her chest from the retraction/tensioning device, insert the buckle latch member within the associated buckle receptacle device, operate the buckle receptacle device to allow for removal of the buckle latch member, manually pull the buckle latch member from the associated buckle receptacle device, and/or pull the seat belt webbing across his/her/its body to a sufficient degree to allow the seat belt webbing to retract within the retraction/tensioning device. However, many occupants find it difficult to perform some or all of these tasks and other tasks associated with manual operation of a typical seat belt. For example, a minor, a pet, incapacitated occupant, or occupant having a physical disability may find it difficult or impossible to manually operate a buckle receptacle device of a seat belt to unlock the buckle latch member, to the pull the buckle latch member from the associated buckle receptacle device, and/or to pull the buckle latch member and webbing across his/her/its body to allow from the retraction/tensioning device to spool up excess seat belt material.

While such an occupant may receive assistance from another occupant of the vehicle (e.g., an associated guardian, an associated owner, an assistant, the operator of the vehicle, etc.), the occupant desiring or requiring assistance may wish to travel without requiring the presence of an assistant. Furthermore, the other occupant may also share some of the physical challenges of the occupant that requires assistance or may not have full use of his/her hands (e.g., a parent with hands full of groceries). Thus, the assistant himself or herself may also have difficulty unlocking and/or retracting the seat belt.

As such, a need exists in the art for a seat belt buckle apparatus and associated occupant restraint system, control system, and method for vehicles that overcome the above limitations.

This background is provided as an illustrative contextual environment only. It will be readily apparent to those of ordinary skill in the art that the systems and methods of the present disclosure may be implemented in other contextual environments as well.

SUMMARY

Therefore, it is an object of the present disclosure to provide seat belt buckle apparatuses and associated occupant restraint systems, control systems, and method for vehicles that overcome the limitations of the known art. Disclosed are embodiments of a buckle apparatus for a vehicle including a locking mechanism and a retention mechanism. The locking mechanism, as described herein, may allow for a latch of a seat belt assembly to be selectively locked within the associated buckle in a locked mode and selectively releasable from the associated buckle in an unlocked mode. The retention mechanism, as described herein, may allow for the latch of the seat belt assembly to be selectively retained within the associated buckle in a retention mode when a withdrawal force applied to the latch is less than a predetermined value. Some embodiments of the retention mechanism may include a release mode allowing the latch to withdraw from the buckle apparatus when the withdrawal force applied to the latch is less than the predetermined value. Further disclosed are embodiments of a system for controlling such buckle apparatuses, locking mechanism, and/or retention mechanisms based on the status of the vehicle (e.g., satisfaction of one or more prerequisite conditions, as described herein). For example, a control unit may provide operational control of a locking actuator and/or retention actuator of the locking mechanism and/or retention mechanism, respectively, based on satisfaction of certain prerequisite conditions.

Further disclosed herein are embodiments of system for operating a configurable buckle apparatus based on the occupant in question. The system may include an occupant type identification module for identifying the occupant's status as an assisted occupant (an occupant requiring or desiring assistance locking or unlocking the buckle apparatus) or an unassisted occupant (an occupant not requiring or desiring assistance locking or unlocking the buckle apparatus) based on occupant quality data. The system for operating the configurable buckle apparatus may further include a locking mechanism control module for operating the locking mechanism of the buckle apparatus for occupants determined to be assisted occupants. In some embodiments, the locking mechanism control module may control the locking mechanism of the buckle apparatus based on the status of the occupant as an assisted occupant and on the status of the vehicle (e.g., satisfaction of one or more prerequisite conditions).

In some embodiments, the occupant type identification module may further identify the occupant's status as retained occupant (an occupant requiring or desiring assistance retracting the seat belt latch and/or webbing from the associated buckle) or an unretained occupant (an occupant not requiring or desiring assistance retracting the seat belt latch and/or webbing from the associated buckle) based on occupant quality data. Such a system for operating the configurable buckle apparatus may further include a retention mechanism control module for operating the retention mechanism of the buckle apparatus for occupants determined to be retained occupants. For example, the retention mechanism control module may control the retention mechanism of the buckle apparatus based on the status of the occupant as a retained occupant and on the status of the vehicle (e.g., satisfaction of one or more prerequisite retention conditions).

Embodiments of the occupant type identification module may include one or more artificial intelligence algorithms utilized to determine an occupant's status as an assistant or unassisted occupant and/or as a retained or unretained occupant. In some embodiments, the occupant type identification module may utilize the occupant quality data to identify an associated occupant profile. The associated occupant profile may include a history of occupant behavior utilized to determine an occupant's status as an assistant or unassisted occupant and/or as a retained or unretained occupant.

To achieve the foregoing and other objects and advantages, in one aspect, the present subject matter is directed to a buckle apparatus for a seat of a vehicle. The buckle apparatus includes a locking mechanism and a retention mechanism arranged within a casing. The locking mechanism is configured to operably engage with a latch coupled to a seat belt webbing of the vehicle such that, in a locked mode, the latch is secured within an insertion slot defined in the casing. In an unlocked mode, locking mechanism is configured such that the latch is removable from the insertion slot of the casing. The retention mechanism is operable with the latch such that, in a retention mode, the retention mechanism is configured to cause the latch to be retained within the insertion slot of the casing when a withdrawal force applied to the latch is less than a predetermined value.

In at least one embodiment, when the retention mechanism is in the retention mode and the locking mechanism is in the unlocked mode, the retention mechanism may be configured to allow the latch to withdraw from the insertion slot of the casing when the withdrawal force applied to the latch is greater than the predetermined value. In an additional or alternative embodiment, the retention mechanism may be configured to transition from the retention mode to a release mode in response to an electrical signal communicated to the retention mechanism. In the release mode, the retention mechanism may be configured to allow the latch to withdraw from the insertion slot of the casing when the withdrawal force applied to the latch is less than the predetermined value and the locking mechanism is in the unlocked mode. In at least some such embodiments or alternative embodiments, a release element may be at least partially arranged within the casing and mechanically coupled with each of the locking mechanism and the retention mechanism. The release element may be selectable to transition the locking mechanism from the locked mode to the unlocked mode and to transition the retention mechanism from the retention mode to the release mode.

In some embodiments, insertion of the latch within the insertion slot may transition the retention mechanism from the release mode to the retention mode, transition the locking mechanism from the unlocked mode to the locked mode, or both. Some embodiments of the locking mechanism may include one or more protrusions configured to operably engage with one or more apertures or indentions defined in the latch. In the locked mode, the protrusion(s) may be received within aperture(s) and/or indention(s) and fixed relative to the casing such that the latch is secured within the insertion slot of the casing. In the unlocked mode, the protrusion(s) may be released from the aperture(s) and/or indention(s), unfixed relative to the casing, or both and such that the latch is removable from the insertion slot of the casing.

In an additional or alternative embodiment, the buckle apparatus may include a retention actuator operably coupled with the retention mechanism and configured to transition the retention mechanism from the retention mode to the release mode in response to the electrical signal communicated to the retention mechanism. The retention actuator may be further configured to transition the retention mechanism from the release mode to the retention mode in response to a different electrical signal communicated to the retention mechanism. In further or different embodiments, the locking mechanism may be configured to transition from the locked mode to the unlocked mode in response to an electrical signal communicated to the locking mechanism. In some such embodiments or alternative embodiments, the buckle apparatus may further include a locking actuator operably coupled with the locking mechanism. The locking actuator may be configured to transition the locking mechanism from the locked mode to the unlocked mode in response to the electrical signal communicated to the locking mechanism, to transition the locking mechanism from the unlocked mode to the locked mode in response to a different electrical signal communicated to the locking mechanism, or both.

In an additional or alternative aspect, the present subject matter is directed to an occupant restraint system for a vehicle including one or more buckle apparatuses. Each buckle apparatus is associated with a seat of the vehicle and includes a locking mechanism and a retention mechanism. The locking mechanism is configured to operably engage with a latch coupled to a seat belt webbing associated with the seat. In a locked mode of the locking mechanism, the latch is secured to the locking mechanism, and, in an unlocked mode, the latch is removable from the locking mechanism. The retention mechanism is operable with the latch such that, in a retention mode, the retention mechanism is configured to cause the latch to be retained by the buckle apparatus when a withdrawal force applied to the latch is less than a predetermined value.

In at least one additional or alternative embodiment, when the retention mechanism is in the retention mode and the locking mechanism is in the unlocked mode, the retention mechanism may be configured to allow removal of the latch from the buckle apparatus when the withdrawal force applied to the latch is greater than the predetermined value. Additionally or alternatively, the retention mechanism may be configured to, in a release mode, allow removal of the latch from the buckle apparatus when the withdrawal force applied to the latch is less than the predetermined value and the locking mechanism is in the unlocked mode. In at least some embodiments, the occupant restraint system may further include one or more seat belt retractors, each seat belt retractor is associated with one of the buckle apparatus(es) and configured to apply tension to the seat belt webbing of the associated seat. The tension applied by each seat belt retractor may be suitable to remove the latch from the buckle apparatus when the retention mechanism is in the release mode.

In at least one embodiment, the occupant restraint system may further include a control unit communicatively coupled to the buckle apparatus(es). The control unit may be configured to communicate a signal to a locking actuator of the associated locking mechanism to cause the locking mechanism to transition from the locked mode to the unlocked mode in response to a communication indicative that one or more prerequisite conditions associated with the buckle apparatus(es) has been satisfied. In some embodiments, the prerequisite condition(s) include one or more of a transmission of the vehicle being transitioned to a park setting, the vehicle being transitioned from an on setting to an off setting, a door associated with an operator's seat of the vehicle being opened, a door associated with the buckle apparatus(es) being opened, the door associated with the buckle apparatus(es) being approached by another occupant of the vehicle, the door associated with the buckle apparatus(es) having the child-lock mode engaged, selecting the unlocked mode for the associated locking mechanism of the buckle apparatus(es) via an infotainment unit associated with the vehicle, or a determination that the occupant restraint system for the vehicle may be safely disengaged. Additionally or alternatively, the control unit may be further configured to communicate a different signal to the locking actuator of the associated locking mechanism to cause the locking mechanism to transition from the unlocked mode to the locked mode in response to a communication indicative of one or more of a transmission of the vehicle being transitioned to a setting other than park, a door associated with an operator's seat of the vehicle being closed, a door associated with the buckle apparatus(es) being closed, selecting the locked mode for the associated locking mechanism of the buckle apparatus(es) via an infotainment unit associated with the vehicle, or the door associated with the buckle apparatus(es) having the child-lock mode engaged.

Furthermore, or alternatively, the control unit may be further configured to communicate a signal to a retention actuator of the associated retention mechanism to cause the associated retention mechanism to transition from the retention mode to the release mode in response to a communication indicative that one or more prerequisite retention conditions associated with the buckle apparatus(es) has been satisfied. In some embodiments, the prerequisite retention condition(s) include one or more of a door associated with an operator's seat of the vehicle being opened, a door associated with the buckle apparatus(es) being opened, the door associated with the buckle apparatus(es) being approached by another occupant of the vehicle, the door associated with the buckle apparatus(es) having a child-lock mode engaged, or selecting the release mode for the retention mechanism of the buckle apparatus(es) via an infotainment unit associated with the vehicle. Additionally or alternatively, the control unit may be further configured to communicate a different signal to the retention actuator of the associated retention mechanism to cause the associated retention mechanism to transition from the release mode to the retention mode in response to a communication indicative of one or more of selecting the retention mode for the associated retention mechanism of the buckle apparatus(es) via an infotainment unit associated with the vehicle, the vehicle being transitioned from an off setting to an on setting, a transmission of the vehicle being transitioned to a setting other than park, a door associated with an operator's seat of the vehicle being closed, a door associated with the buckle apparatus(es) being closed, or the door associated with the buckle apparatus(es) being in a child-lock mode.

In an additional or alternative aspect, the present disclosure is directed to a non-transitory computer-readable medium comprising instructions stored in at least one memory that, when executed by one or more processors, cause the processor(s) to carry out steps. The steps include determining that one or more prerequisite conditions associated with one or more buckle apparatuses of an occupant restraint system has been satisfied. The steps further include communicating, in response to the determination that the prerequisite condition(s) associated with the buckle apparatus(es) has been satisfied, a signal to a locking mechanism of each of the buckle apparatus(es) determined to satisfy the prerequisite condition(s). The communicated signal causes the locking mechanism to transition from a locked mode, in which a latch coupled to a seat belt webbing associated with the buckle apparatus is secured to the locking mechanism, to an unlocked mode, in which the latch is removable from the locking mechanism. Each of the buckle apparatus(es) includes a retention mechanism operable with the latch such that, in a retention mode, the retention mechanism is configured to cause the latch to be retained by the buckle apparatus when a withdrawal force applied to the latch is less than a predetermined value. When the retention mechanism is in the retention mode and the locking mechanism is in the unlocked mode, the retention mechanism is configured to allow removal of the latch from the buckle apparatus when the withdrawal force applied to the latch is greater than the predetermined value.

In at least one embodiment, the steps may further include receiving a communication indicative of the status of the prerequisite condition(s) associated with the buckle apparatus(es) of the occupant restraint system. In some embodiments, the prerequisite condition(s) may include one or more of a transmission of the vehicle being transitioned to a park setting, the vehicle being transitioned from an on setting to an off setting, a door associated with an operator's seat of the vehicle being opened, a door associated with the buckle apparatus(es) being opened, the door associated with the buckle apparatus(es) being approached by another occupant of the vehicle, the door associated with the buckle apparatus(es) having a child-lock mode engaged, selecting the unlocked mode for the locking mechanism of the buckle apparatus(es) via an infotainment unit associated with the vehicle, or a determination that the occupant restraint system for the vehicle may be safely disengaged. In an additional or alternative embodiment, the steps may further include communicating a different signal to the locking mechanism of the buckle apparatus(es) to cause the locking mechanism to transition from the unlocked mode to the locked mode in response to a communication indicative that one or more of a transmission of the vehicle being transitioned to a setting other than park, a door associated with an operator's seat of the vehicle being closed, a door associated with the buckle apparatus(es) being closed, selecting the locked mode for the locking mechanism of the buckle apparatus(es) via an infotainment unit associated with the vehicle, or the door associated with the buckle apparatus(es) having the child-lock mode engaged.

In some embodiments, the steps may further include receiving a communication indicative of the status of one or more prerequisite retention conditions associated with the buckle apparatus(es) of the occupant restraint system. In an additional or alternative embodiment, the steps may further include determining that the prerequisite retention condition(s) associated with the buckle apparatus(es) has been satisfied. In response to the determination that the prerequisite retention condition(s) associated with the buckle apparatus(es) has been satisfied, the steps may further include communicating a signal to the retention mechanism of each of the buckle apparatus(es) determined to satisfy the prerequisite retention condition(s) and causing the retention mechanism to transition from the retention mode to a release mode. In the release mode, the retention mechanism may be configured to allow the latch to withdraw from the buckle apparatus when the withdrawal force applied to the latch is less than the predetermined value and the locking mechanism is in the unlocked mode. The prerequisite retention condition(s) may include one or more of a door associated with an operator's seat of the vehicle being opened, a door associated with the buckle apparatus(es) being opened, the door associated with the buckle apparatus(es) being approached by another occupant of the vehicle, the door associated with the buckle apparatus(es) having a child-lock mode engaged, or selecting the release mode for the retention mechanism of the buckle apparatus(es) via an infotainment unit associated with the vehicle.

In an additional or alternative embodiment, the steps may further include communicating a different signal to the buckle apparatus(es) to cause the retention mechanism to transition from the release mode to the retention mode in response to a communication indicative of one or more of selecting the retention mode for the retention mechanism of the buckle apparatus(es) via an infotainment unit associated with the vehicle, the vehicle being transitioned from an off setting to an on setting, a transmission of the vehicle being transitioned to a setting other than park, a door associated with an operator's seat of the vehicle being closed, a door associated with buckle apparatus(s) being closed, or the door associated with the buckle apparatus(es) being in a child-lock mode.

In an additional or alternative aspect, the present disclosure is directed to a system for operating a configurable buckle apparatus. The system includes an occupant type identification module including instructions stored in at least one memory and executable by one or more processors to cause the occupant type identification module to determine, based on data indicative of one or more occupant qualities of an occupant seated within a seat of a vehicle, the occupant's status as an assisted occupant or an unassisted occupant. The system further includes a locking mechanism control module including instructions stored in at least one memory and executable by one or more processors to cause the locking mechanism control module to communicate a signal to a locking mechanism of the configurable buckle apparatus to cause the locking mechanism to transition from a locked mode to an unlocked mode in response to the determination of an assisted occupant. In the locked mode, the locking mechanism is secured to a latch coupled to a seat belt webbing associated with the seat, and, in the unlocked mode of the locking mechanism, the latch is removable from the locking mechanism.

In at least one embodiment, determining the occupant's status as an assisted occupant or an unassisted occupant may include instructions stored in the memory (ies) and executable by the processor(s) to cause the occupant type identification module to determine the occupant's status as an assisted occupant or an unassisted occupant utilizing an artificial intelligence algorithm and based on the data indicative of the occupant quality (ies) of the occupant seated within the seat of the vehicle. Additionally or alternatively, determining the passenger's status as an assisted occupant may include determining that the occupant is one or more of a minor, a pet, incapacitated, or has a physical disability.

In some further or alternative embodiments, determining the occupant's status as an assisted occupant or an unassisted occupant may include instructions stored in the memory (ies) and executable by the processor(s) to cause the occupant type identification module to compare the data indicative of the occupant quality (ies) with multiple occupant profiles and identify an occupant profile associated with the data indicative of the occupant quality (ies). The instructions executable by the processor(s) may further cause the occupant type identification module to determine the occupant's status as an assisted occupant or an unassisted occupant based on the data indicative of the occupant quality (ies) and a history of occupant behavior indicated by the associated occupant profile. In some embodiments, the history of occupant behavior may include data indicative of a door associated with the occupant of the occupant profile being in a child-lock mode, a frequency of the door associated with the occupant of the occupant profile being in the child-lock mode, a configurable buckle apparatus associated with the occupant of the occupant profile being set to the locked mode selectable via an infotainment unit of the vehicle, or a frequency of the configurable buckle apparatus associated with the occupant of the occupant profile being set to the locked mode selectable via the infotainment unit of the vehicle.

In some embodiments, the locking mechanism control module may further include instructions stored in the memory (ies) and executable by the processor(s) to cause the locking mechanism control module to determine that one or more prerequisite conditions associated with the configurable buckle apparatus of the seat has been satisfied prior to communicating the signal to the locking mechanism of the configurable buckle apparatus to cause the locking mechanism to transition from the locked mode to the unlocked mode. Additionally or alternatively, the prerequisite condition(s) may include one or more of a transmission of the vehicle being transitioned to a park setting, the vehicle being transitioned from an on setting to an off setting, a door associated with an operator's seat of the vehicle being opened, a door associated with the configurable buckle apparatus being opened, the door associated with the configurable buckle apparatus being approached by another occupant of the vehicle, or a determination that the occupant restraint system for the vehicle may be safely disengaged. In some such embodiments or differently configured embodiments, the locking mechanism control module may further include instructions stored in the memory (ies) and executable by the processor(s) to cause the locking mechanism control module to communicate a different signal to the locking mechanism of the configurable buckle apparatus to cause the locking mechanism to transition from the unlocked mode to the locked mode in response to the determination of an assisted occupant and one or more of a transmission of the vehicle being transitioned to a setting other than park, a door associated with an operator's seat of the vehicle being closed, or a door associated with configurable buckle apparatus being closed.

In at least some embodiments, the configurable buckle apparatus may further include a retention mechanism operable with the latch such that, in a retention mode, the retention mechanism is configured to cause the latch to be retained by the buckle apparatus when a withdrawal force applied to the latch is less than a predetermined value. Additionally or alternatively, when the retention mechanism is in the retention mode and the locking mechanism is in the unlocked mode, the retention mechanism may be configured to allow removal of the latch from the configurable buckle apparatus when the withdrawal force applied to the latch is greater than the predetermined value. Additionally or alternatively, in a release mode of the retention mechanism, the retention mechanism may be configured to allow removal of the latch from the configurable buckle apparatus when the withdrawal force applied to the latch is less than the predetermined value and the locking mechanism is in the unlocked mode.

In some embodiments, the occupant type identification module may further include instructions stored in the memory (ies) and executable by the processor(s) to cause the occupant type identification module to determine the occupant's status as a retained occupant or an unretained occupant based on the data indicative of the occupant quality (ies). In some such embodiments, the system may further include a retention mechanism control module including instructions stored in the memory (ies) and executable by the processor(s) to cause the retention mechanism control module to communicate a signal to the retention mechanism of the configurable buckle apparatus to cause the retention mechanism to transition from the retained mode to the release mode in response to the determination of the retained occupant.

In at least some embodiments, determining the occupant's status as a retained occupant or an unretained occupant may include instructions stored in the memory (ies) and executable by the processor(s) to cause the occupant type identification module to compare the data indicative of the occupant quality (ies) with multiple occupant profiles and identify an occupant profile associated with the data indicative of the occupant quality (ies). In some such embodiments or differently configured embodiments, the occupant type identification module may further include instructions stored in the memory (ies) and executable by the processor(s) to cause the occupant type identification module to determine the occupant's status as a retained occupant or an unretained occupant based on the data indicative of the occupant quality (ies) and a history of occupant behavior indicated by the associated occupant profile. The history of occupant behavior may include data indicative of a door associated with the occupant of the occupant profile being in a child-lock mode, a frequency of the door associated with the occupant of the occupant profile being in the child-lock mode, the retention mechanism of the configurable buckle apparatus associated with the occupant of the occupant profile being set to the retention mode selectable via an infotainment unit of the vehicle, or a frequency of the retention mechanism of the configurable buckle apparatus associated with the occupant of the occupant profile being set to the retention mode selectable via the infotainment unit of the vehicle.

In some further or alternative embodiments, the retention mechanism control module may further include instructions stored in the memory (ies) and executable by the processor(s) to cause the retention mechanism control module to determine that one or more prerequisite retention conditions associated with the configurable buckle apparatus of the seat has been satisfied prior to communicating the signal to the retention mechanism of the configurable buckle apparatus to cause the retention mechanism to transition from the retained mode to the release mode. In some such embodiments, the prerequisite retention condition(s) may include one or more of a door of an operator's seat of the vehicle being opened, a door associated with the configurable buckle apparatus being opened, or the door associated with the configurable buckle apparatus being approached by another occupant of the vehicle. In additional or alternative embodiments, the retention mechanism control module may further include instructions stored in the memory (ies) and executable by the processor(s) to cause the retention mechanism control module to communicate a different signal to the retention mechanism of the configurable buckle apparatus to cause the retention mechanism to transition from the release mode to the retention mode in response to the determination of the retained occupant and one or more of the vehicle being transitioned from an off setting to an on setting, a transmission of the vehicle being transitioned to a setting other than park, a door associated with an operator's seat of the vehicle being closed, or a door associated with the configurable buckle apparatus being closed.

In an additional or alternative aspect, the present disclosure is directed to a non-transitory computer-readable medium stored in at least one memory and executable by one or more processors to perform steps. One step includes receiving data indicative of one or more occupant qualities of an occupant seated within a seat of a vehicle. A further step includes determining the occupant's status as an assisted occupant or an unassisted occupant based on the received data. Another step includes communicating, in response to the determination of an assisted occupant, a signal to a locking mechanism of a configurable buckle apparatus to cause the locking mechanism to transition from a locked mode, in which the locking mechanism is secured to a latch coupled to a seat belt webbing associated with the seat, to an unlocked mode, in which the latch is removable from the locking mechanism.

In some embodiments, determining the occupant's status as an assisted occupant may include determining the occupant's status as an assisted occupant or an unassisted occupant based on the received data and utilizing an artificial intelligence algorithm. Additionally or alternatively, determining the occupant's status as an assisted occupant may include determining that the occupant is one or more of a minor, a pet, incapacitated, or has a physical disability. In further or alternative embodiments, determining the occupant's status as an assisted occupant may include comparing the data indicative of the occupant quality (ies) with multiple occupant profiles and identifying an occupant profile associated with the data indicative of the occupant quality (ies). In some such embodiments, determining the occupant's status as an assisted occupant or an unassisted occupant may be based on the data indicative of the occupant quality (ies) and a history of occupant behavior indicated by the associated occupant profile.

In additional or alternative embodiments, the configurable buckle apparatus may further include a retention mechanism operable with the latch such that, in a retention mode, the retention mechanism is configured to cause the latch to be retained by the buckle apparatus when a withdrawal force applied to the latch is less than a predetermined value. Furthermore, when the retention mechanism is in the retention mode and the locking mechanism is in the unlocked mode, the retention mechanism may be configured to allow removal of the latch from the buckle apparatus when the withdrawal force applied to the latch is greater than the predetermined value. Additionally or alternatively, the steps may further include determining the occupant's status as a retained occupant or an unretained occupant based on the data indicative occupant quality (ies). The steps may further include communicating a signal to the retention mechanism of the configurable buckle apparatus to cause the retention mechanism to transition from the retained mode to a release mode in response to the determination of the retained occupant. In the release mode, the retention mechanism may be configured to allow removal of the latch from the configurable buckle apparatus when the withdrawal force applied to the latch is less than the predetermined value and the locking mechanism is in the unlocked mode. In further or alternative embodiments, determining the occupant's status as a retained occupant or an unretained occupant may include comparing the data indicative of the occupant quality (ies) with the multiple occupant profiles and identifying an occupant profile associated with the data indicative of the occupant quality (ies). The occupant's status as a retained occupant or an unretained occupant may be determined based on the data indicative of the occupant quality (ies) and a history of occupant behavior indicated by the associated occupant profile.

Embodiments of the invention can include one or more or any combination of the above features and configurations.

Additional features, aspects, and advantages of the invention will be set forth in the detailed description of illustrative embodiments that follows, and in part will be readily apparent to those skilled in the art from that description or recognized by practicing the invention as described herein. It is to be understood that both the foregoing general description and the following detailed description present various embodiments of the invention and are intended to provide an overview or framework for understanding the nature and character of the invention as it is claimed. The accompanying drawings are included to provide a further understanding of the invention and are incorporated in and constitute a part of this specification.

BRIEF DESCRIPTION OF THE DRAWINGS

A full and enabling disclosure of the present invention, including the best mode thereof, directed to one of ordinary skill in the art, is set forth in the specification, which makes reference to the companying drawings, in which.

Figure 1:
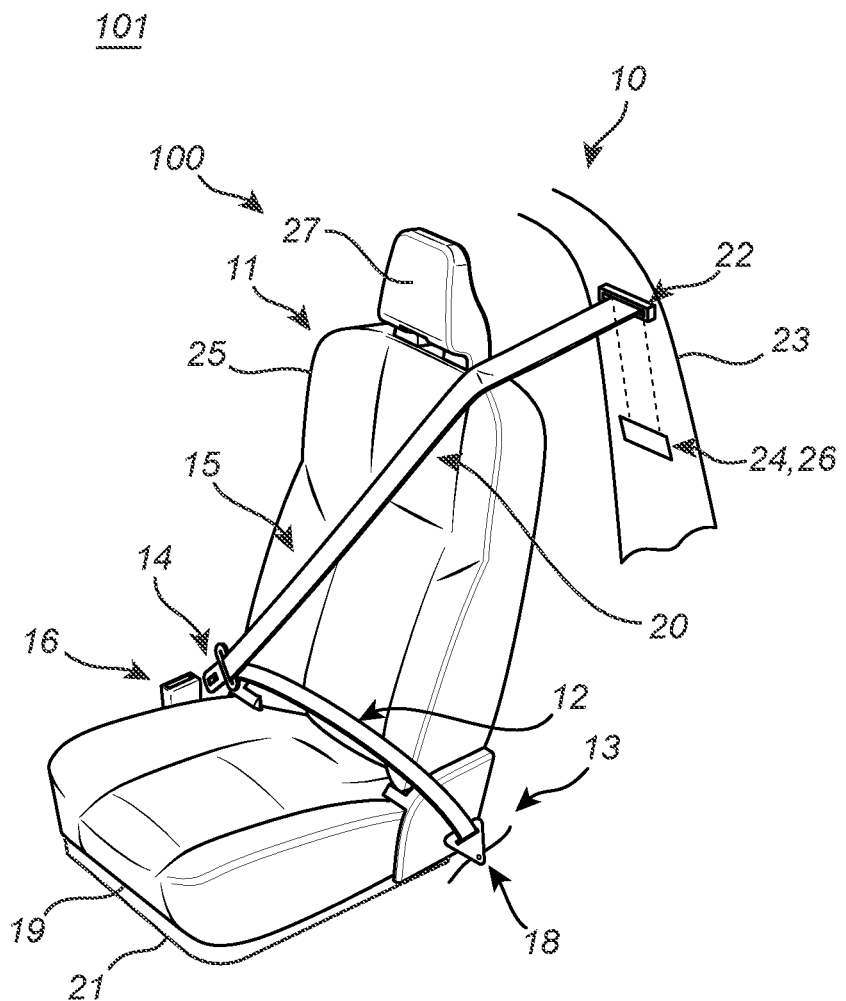
FIG. 1 illustrates a perspective view of an exemplary embodiment of an occupant restraint system of a vehicle, in accordance with aspects of the present subject matter.

Repeat use of reference characters in the present specification and drawings is intended to represent the same or analogous features or elements of the present invention.

DESCRIPTION OF ILLUSTRATIVE EMBODIMENTS

The present invention will now be described more fully hereinafter with reference to the accompanying drawings in which exemplary embodiments of the invention are shown. However, the invention may be embodied in many different forms and should not be construed as limited to the representative embodiments set forth herein. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. It is envisioned that other embodiments may perform similar functions and/or achieve similar results. Any and all such equivalent embodiments and examples are within the scope of the present invention and are intended to be covered by the appended claims.

The exemplary embodiments are provided so that this disclosure will be both thorough and complete and will fully convey the scope of the invention and enable one of ordinary skill in the art to make, use, and practice the invention. The word "exemplary" is used herein to mean "serving as an example, instance, or illustration." Any implementation described herein as "exemplary" is not necessarily to be construed as preferred or advantageous over other implementations.

The terms "coupled," "fixed," "attached to," "communicatively coupled to," "operatively coupled to," and the like refer to both direct coupling, fixing, attaching, communicatively coupling, and operatively coupling as well as indirect coupling, fixing, attaching, communicatively coupling, and operatively coupling through one or more intermediate components or features, unless otherwise specified herein. "Communicatively coupled to" and "operatively coupled to" can refer to physically and/or electrically related components.

As used herein, the terms "first", "second", and "third" may be used interchangeably to distinguish one component from another and are not intended to signify location or importance of the individual components. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now specifically to FIG. 1, a perspective view of one exemplary embodiment of an occupant restraint system of a vehicle is illustrated in accordance with aspects of the present subject matter. As shown, a vehicle 10 (see also FIG. 5) may generally include an occupant restraint system 100 and/or one or more buckle apparatuses 16, as described herein. For example, the occupant restraint system 10 may include a buckle apparatus 16 for each seat belt assembly 15 and a seat belt assembly 15 for each seat 11 provided in the vehicle 10.

Figure 5:
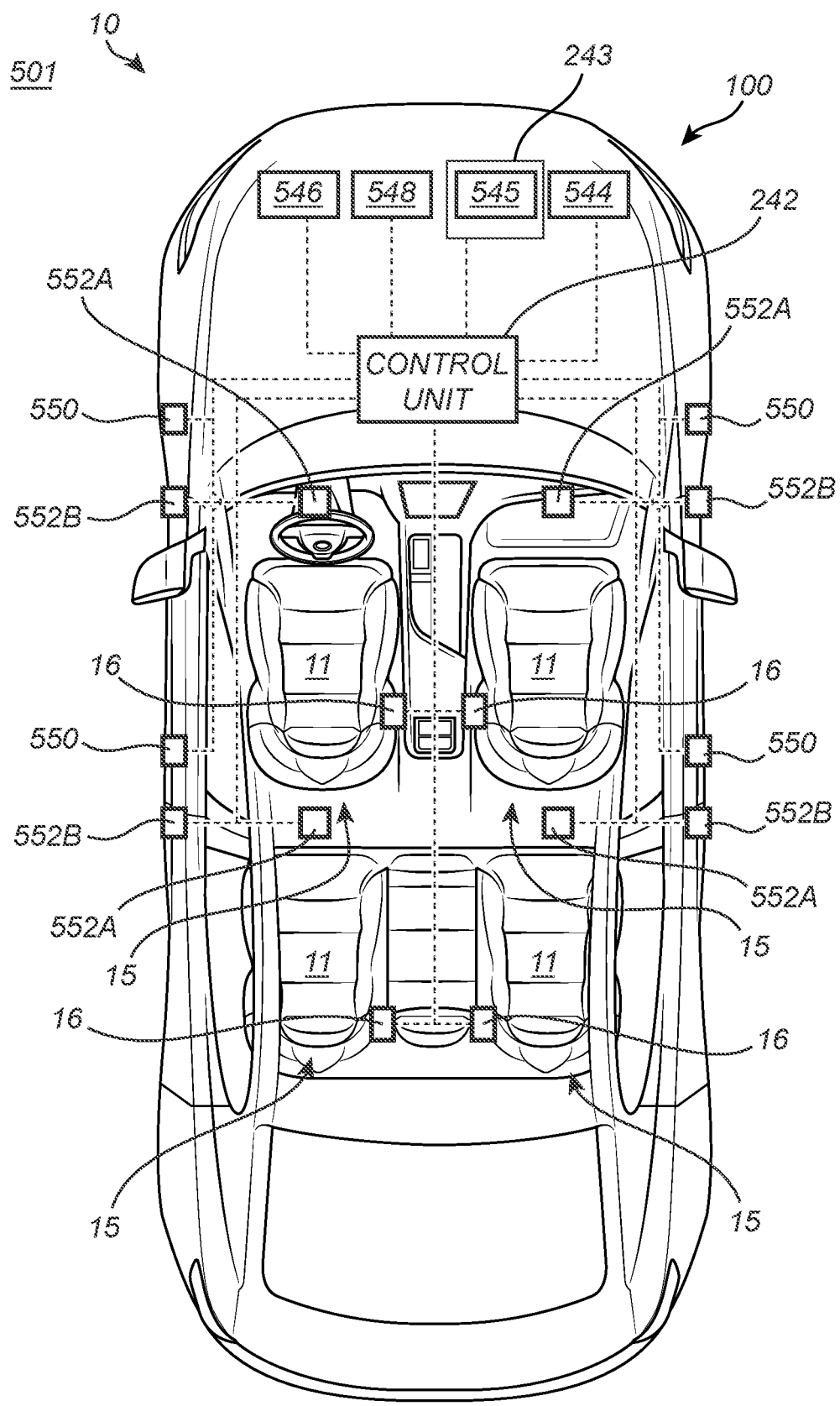
FIG. 5 illustrates a schematic diagram of an exemplary embodiment of an occupant restraint system, in accordance with aspects of the present subject matter.

In some embodiments, the vehicle 10 may be an electric vehicle having electrical components (e.g., batteries) for propelling the vehicle 10. Alternatively, the vehicle 10 may be configured with a rear-mounted or front-mounted internal combustion engine. In other embodiments, the vehicle 10 may be configured as a hybrid vehicle, which is driven by both gasoline and electrical power. It will be appreciated that the exemplary vehicle(s) 10 depicted in FIGS. 1 and 5 are by way of example only, and that, in other exemplary embodiments, the vehicle 10 may have any other suitable configuration, including, for example, any other suitable number of rows of seats, rows of doors, etc. Additionally or alternatively, in other exemplary embodiments, any other suitable power sources may be provided. For example, the vehicle 10 may include a liquid hydrogen powered engine, a gas turbine engine, an inboard motor, an outboard motor, etc.

While embodiments of the vehicle 10 herein may be illustrated or described as an automotive vehicle, it should be appreciated that the present disclosure is equally applicable to any other form of transportation (e.g., trains, rotary-wing aircraft, fixed-wing aircraft, boats, busses, passenger rail cars, public transportation, amusement rides/carts, and the like) where an occupant restraint system and/or a buckle apparatus is desired or required for occupant safety. In fact, aspects of the present subject matter may be particularly suitable for types of transportation in which a transport assistant (flight attendant or the like) is provided to assist occupants prior to, during, or after travel or movement in the vehicle 10.

Regardless of the type of power train, design, or model of the vehicle 10, the vehicle 10 may include occupant the restraint system 100 and/or the buckle apparatus(es) 16, as described herein. Referring now specifically to FIG. 1, in one exemplary embodiment, the seat belt assembly (ies) 15, when fastened, is disposed about a vehicle seat 11 and the waist and chest and shoulder of a vehicle occupant seated in the seat 11, as a conventional seat belt assembly is.

In general, the seat belt assembly 15 may include a seat belt webbing (lap belt 12) that is coupled to a body 13 of the vehicle 10 on one side of the seat 11 at one end and to a buckle member latch (latch 14) that is configured to selectively engage the buckle apparatus 16 disposed on an opposite side of the seat 11 at an opposite end. The latch 14 and the buckle apparatus 16 form a detachable anchor point for the seat belt assembly 15. At one end, the lap belt 12 is preferably coupled to a fixed or pivoting anchor member 18 disposed along or protruding from the floor of the vehicle 10, adjacent to a side of the seat bottom 19 and/or seat base 21. Alternatively, the lap belt 12 can be directly or indirectly coupled to a retraction/tensioning device (described in greater detail below) at this point. At the opposite end, the lap belt 12 is coupled to or passes through a body or slot manufactured into the latch 14, which includes a tab for securely engaging the buckle apparatus 16 with the push of a button or the like. The buckle apparatus 16 is rigidly or pivotably disposed along or protruding from the floor of the vehicle 10, adjacent to a side of the seat bottom 19, and/or seat base 21 opposite the anchor member 18. Again, the latch 14 and buckle apparatus 16 collectively form a detachable anchor point when engaged with one another. In use, the lap belt 12 is configured to be selectively disposed across the waist of the occupant. As the lap belt 12 passes through the latch 14 and/or is retractable, its length can vary to comfortably accommodate different occupants. The lap belt 12 is made of a webbing material that receives and softens the force of a braking and/or impact event, such as polyester or nylon webbing material woven from warp and weft strands.

The seat belt assembly 15 also typically includes a shoulder belt 20 (e.g., a portion of the seat belt webbing forming the lap belt 12 or a distinct seat belt webbing) that is coupled to the latch 14 at one end and to the body (e.g., a pillar 23, such as the B-pillar for suitably configured vehicles) of the vehicle 10 at an opposite end. The shoulder belt 20 may be configured to be selectively disposed across the chest and shoulder of the occupant when fastened. Again, the shoulder belt 20 may include or be formed from a webbing material that receives and softens the force of a braking and/or impact event, such as polyester or nylon webbing material. Optionally, the lap belt 12 and the shoulder belt 20 are integrally formed, consisting of one unitary belt that passes through the latch 14 between the anchor member 18 and the pillar 23, making both the lap belt 12 and the shoulder belt 20 adjustable to comfortably accommodate different occupants. In this case, the movement of the latch 14 along the unitary belt is typically limited to a range, and the latch 14 acts as a demarcation point between what is ultimately referred to as the lap belt 12 and the shoulder belt 20.

The opposite end of the shoulder belt 20 may be coupled to the body of the vehicle 10 (e.g., pillar 23) via one or more of a routing device 22 and a retraction/tensioning device (seat belt retractor 24). For example, the shoulder belt 20 can first be received by the routing device 22 at a relatively higher position along the pillar 23, such as adjacent to the top portion of the seat back 25, the head rest 27, and the head of the occupant. The shoulder belt 20 can then be fed to the seat belt retractor 24 at a relatively lower position along or within the pillar 23 or along the body and/or floor of the vehicle 10. Alternatively, the routing device 22 and the seat belt retractor 24 can be integral or collocated at the upper portion of the pillar 23. The seat belt retractor 24 may be operable for spooling out and taking up seat belt webbing of the shoulder belt 20 when the seat belt assembly 15 is fastened and removed and limiting spooling out (i.e., locking) of the seat belt webbing and/or the shoulder belt 20 upon the occurrence of a braking and/or impact event. In various embodiments herein, the seat belt retractor 24 may provide tension on the seat belt webbing and/or shoulder belt 20 sufficient to cause the seat belt webbing to retract within the seat belt retractor 24 when the latch 14 in not secured to the buckle apparatus 16 and no other external force counteracts the tension provided by the seat belt retractor 24.

Optionally, the seat belt retractor 24 includes or is associated with a mechanical or explosive pre-tensioning device 26 operable for removing slack from the seat belt webbing and/or shoulder belt 20 upon the occurrence of the braking and/or impact event of the vehicle 10. Such pre-tensioning devices are well known to those of ordinary skill in the art. All such pre-tensioning devices will act on both the lap belt 12 and the shoulder belt 20 if a unitary belt is used, as described herein above. Ultimately, the lap belt 12 applies a restraint force against the waist of the vehicle occupant and the shoulder belt 20 applies a restraint force against the torso of the vehicle occupant when the seat belt retractor 24 and/or pre-tensioning device 26 is limited or locks, holding the vehicle occupant securely against the seat bottom 19 and seat back 25, respectively.

While the above seat belt assembly 15 is illustrated and describe in the context of a 3-point seat belt, it should be appreciated that additional or alternative configurations of the seat belt assembly 15 may be configured to include a lap belt only, a shoulder belt only, a belt-in-seat arrangement, a 5-point seatbelt, and/or a 6-point harness. Furthermore, different embodiments of the seat belt assembly may include additional or alternative buckle apparatus(s) 16 and/or latches 14 suitable for the corresponding type of seat belt assembly 15.

Figure 2:
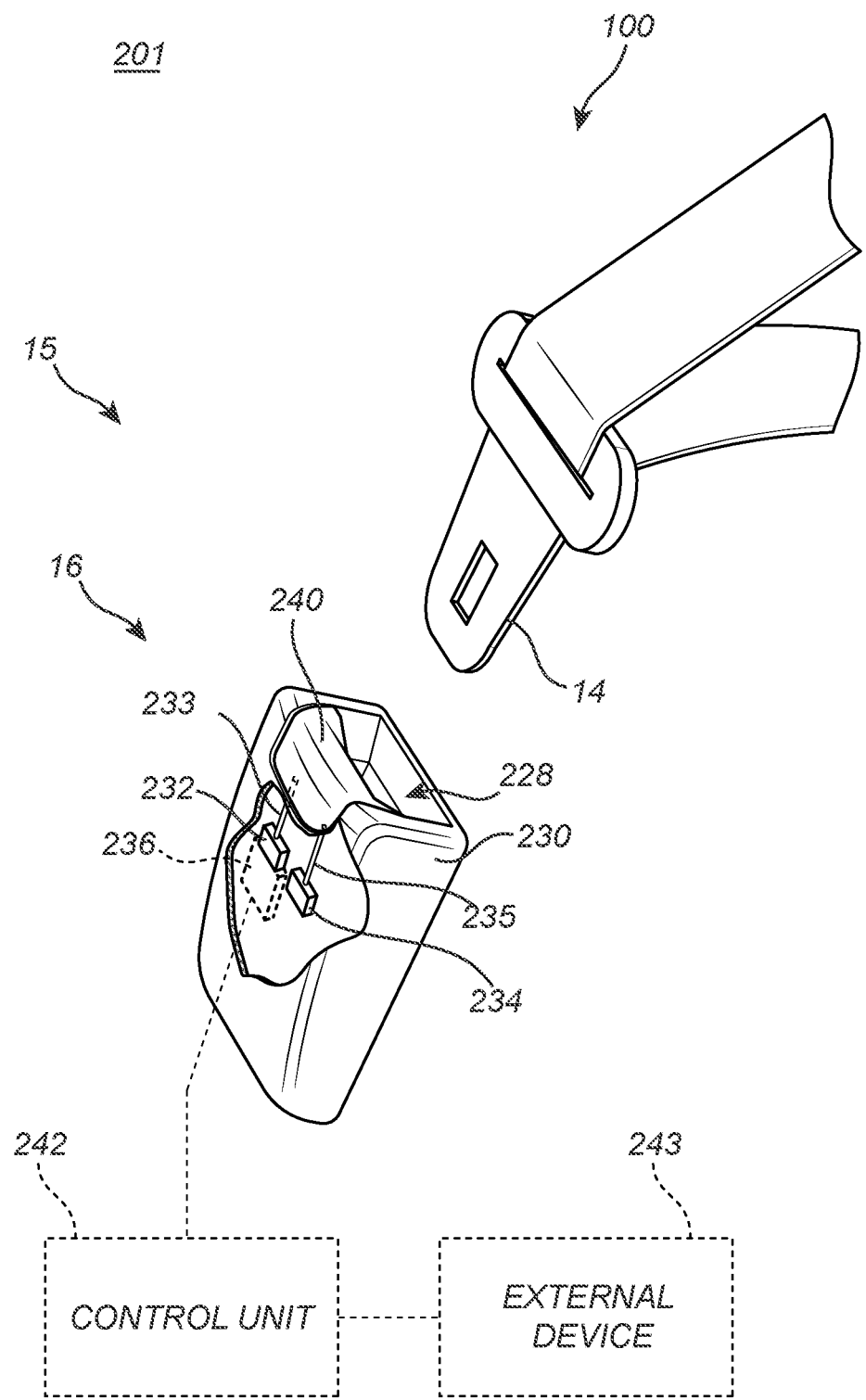
FIG. 2 illustrates a perspective and schematic view of an exemplary embodiment of a buckle apparatus, in accordance with aspects of the present subject matter.
Figure 3:
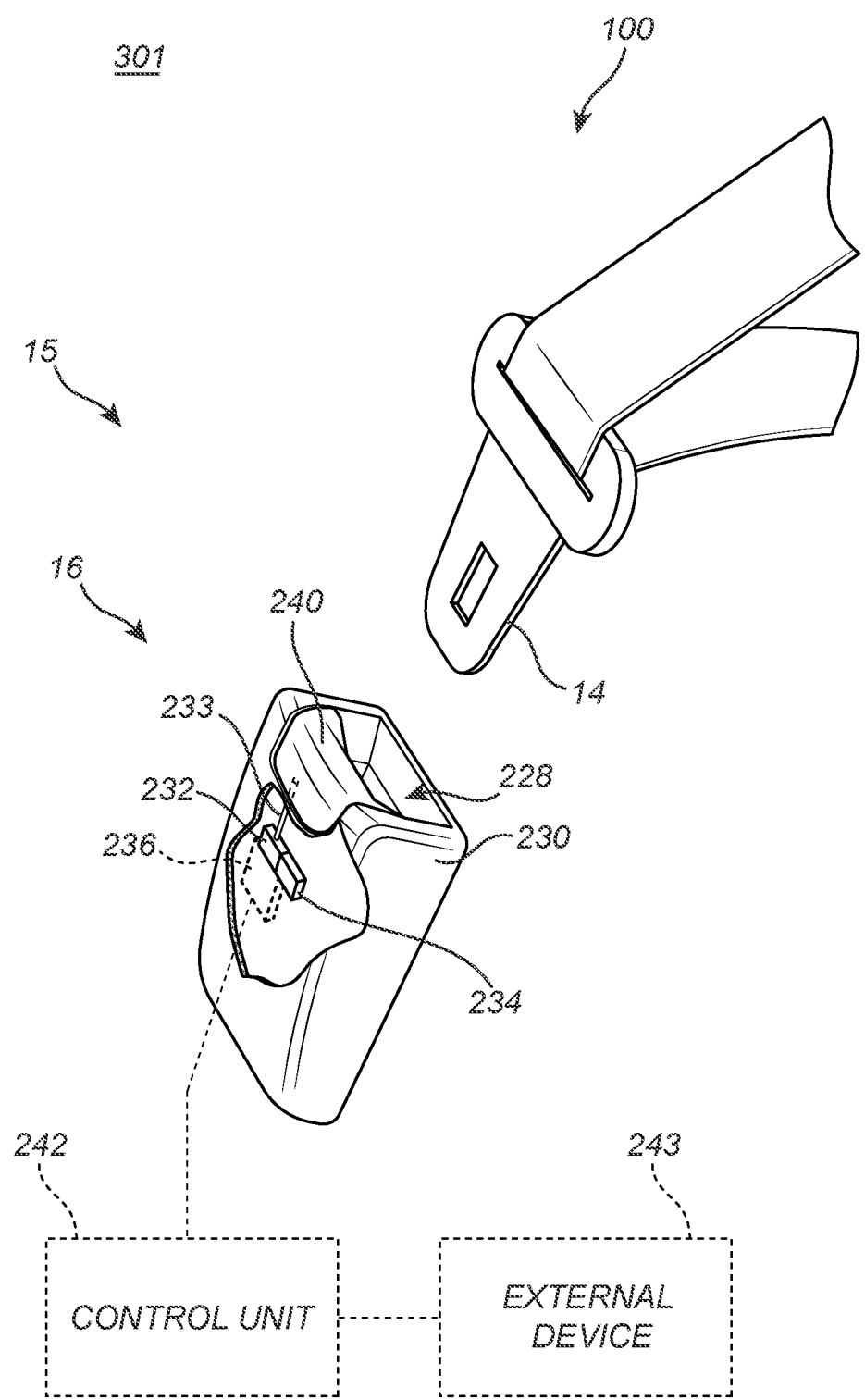
FIG. 3 illustrates a perspective and schematic view of another exemplary embodiment of a buckle apparatus, in accordance with aspects of the present subject matter.
Figure 4:
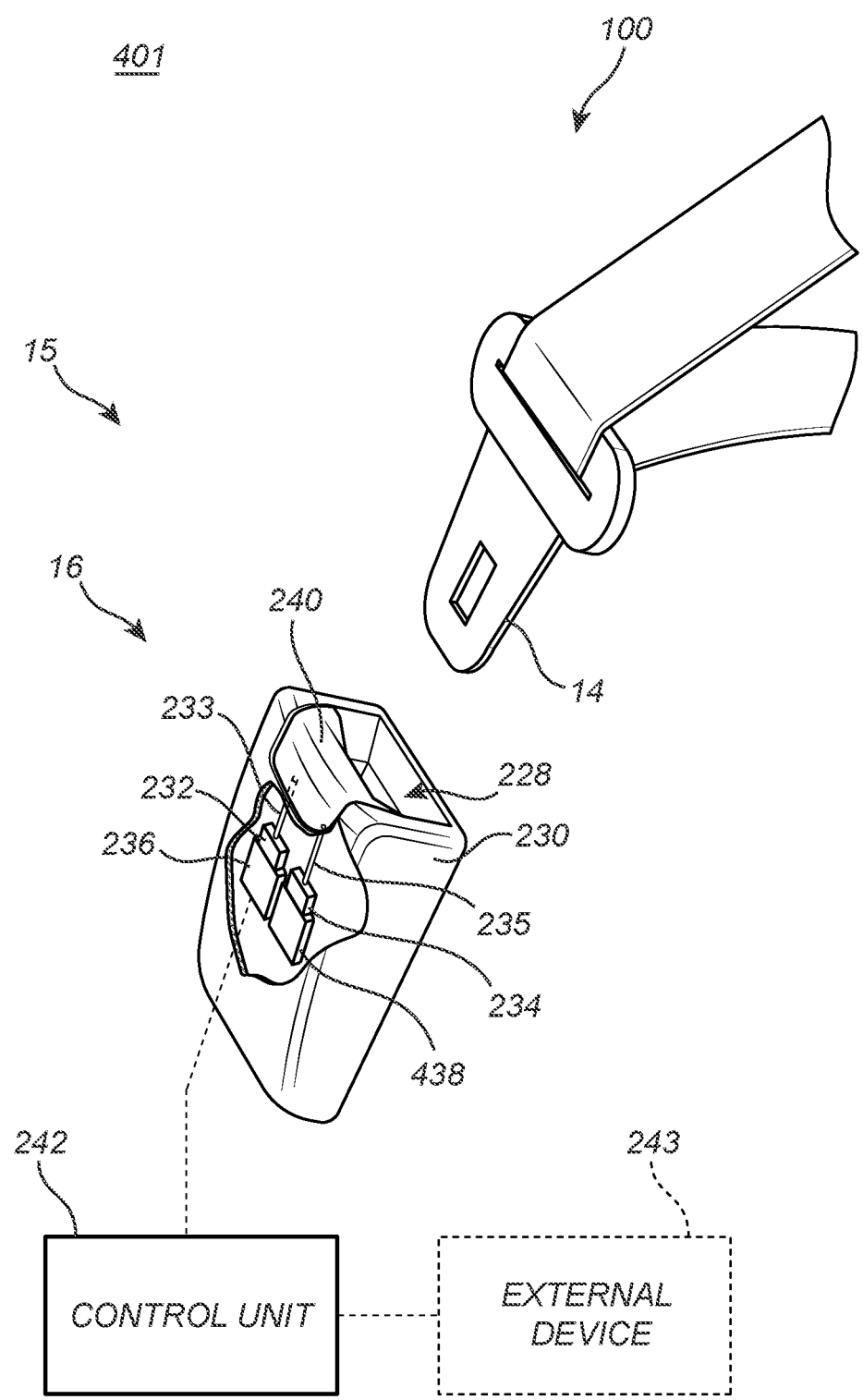
FIG. 4 illustrates a perspective and schematic view of another exemplary embodiment of a buckle apparatus, in accordance with aspects of the present subject matter.

Referring now to FIGS. 2-4, schematic views of exemplary embodiments of a buckle apparatus are illustrated in accordance with aspects of the present subject matter. One or more buckle apparatus(s) 16 may be incorporated into the vehicle 10, as described above in reference to FIG. 1, or alternatively may be integrated into any other suitable vehicle. For example, the buckle apparatus(s) 16 may be incorporated into the seat belt assembly (ies) 15 of the occupant restraint system 100 or one or more seat belt assemblies of a suitably configured occupant restraint system and/or vehicle. As shown, the buckle apparatus(s) 16 may each include a locking mechanism 232 and a retention mechanism 234 arranged within a casing 230 of the buckle apparatus 16. Furthermore, each buckle apparatus 16 generally includes or defines an insertion slot 228 within the casing 230 such that the buckle apparatus 16 may receive the latch 14 of the associated seat belt assembly 15 within the insertion slot 228 (e.g., latch 14 or a flange, protrusion, or the like thereof).

Still referring generally to FIGS. 2-4, each buckle apparatus 16 may include the locking mechanism 232 configured to operably, selectively engage with the latch 14 of the seat belt assembly 15. As explained and depicted with respect to FIG. 1 above, the latch 14 may be coupled to one or more seat belt webbings (e.g., lap belt 12 and/or shoulder belt 20) of the associated seat belt assembly 15 and/or seat 11 (belts 12, 20 and seat 11 omitted from FIGS. 2-4).

Various embodiments of the locking mechanism 232 may be configured to operate in at least two modes or configurations including a locked mode and/or an unlocked mode. In the locked mode of the locking mechanism 232, the latch 14 may be secured to the locking mechanism 232, and, in the unlocked mode, the latch 14 may be removable from the locking mechanism 232. More particularly, for at least some embodiments, the locking mechanism 232 may operably engage with the latch 14 such that, in the locked mode, the latch 14 is secured within the insertion slot 228 defined in the casing 230 of the associated buckle apparatus 14. In the unlocked mode, locking mechanism 232 may allow removal of the latch 14 the insertion slot 228 of the casing 230 of the associated buckle apparatus 14.

Described below are exemplary configurations, components, etc. of locking mechanisms of a buckle apparatus that may be utilized in association with embodiments of the buckle apparatus(s) 16 and/or the occupant restraint system 100 described herein. However, persons skilled in the art will appreciate that the present disclosure is equally applicable to additional or alternative locking mechanisms 232 suitable to selectively secure the latch 14 to or within the buckle apparatus 16. For instance, some embodiments of the locking mechanism 232 may include one or more protrusions configured to operably engage with one or more apertures or indentions defined in the latch 14. In the locked mode, the protrusion(s) of the locking mechanism 232 may be received within the aperture(s) and/or indention(s) of the latch 14 and fixed relative to the casing 230 (e.g., a fixed position and/or orientation relative to the casing 230). Thus, the latch 14 may be secured within the insertion slot 228 of the casing 230 of the buckle apparatus 16 when in the locked mode. In the unlocked mode, the protrusion(s) of the locking mechanism 132 may be released and/or withdrawn from the aperture(s) and/or indention(s) of the latch 14, unfixed relative to the casing 230 of the buckle apparatus 14 (e.g., allowed to translate and/or rotate with respect to the casing 230), or both. Thus, the latch 14 may be removable from the insertion slot 228 of the casing 230 of the buckle apparatus 16 when in the unlocked mode and a sufficient withdrawal force (e.g., a withdrawal force opposite an insertion force utilized to insert the latch 14 within the insertion slot 228) is applied to the latch 14.

Still referring generally to FIGS. 2-4, each buckle apparatus 16 may include the retention mechanism 234 configured to operably (optionally selectively) engage with the latch 14 of the seat belt assembly 15 to retain the latch 14 within the buckle apparatus 16 when the withdrawal force is less than a predetermined value. Some embodiments of the retention mechanism 234 may be configured to operate in at least two modes or configurations including a retention mode and/or a release mode. Other embodiments of the retention mechanism 234 may always operate with the latch 14, when inserted in the insertion slot 228, to retain the latch 14. In other words, some embodiments of the retention mechanism 234 may only have one mode, e.g., the retention mode.

The retention mechanism 234 may generally be operable with the latch 14 such that, in the retention mode, the retention mechanism 234 is configured to cause the latch 14 to be retained by the buckle apparatus 16 when the withdrawal force applied to the latch 14 is less than a predetermined value. For instance, the retention mechanism 234 may be operable with the latch 14 such that, in the retention mode, the retention mechanism 234 is configured to cause the latch 14 to be retained within the insertion slot 228 of the casing 230 when the withdrawal force applied to the latch 14 is less than the predetermined value.

In some embodiment, when the retention mechanism 234 is in the retention mode and the locking mechanism 232 is in the unlocked mode, the retention mechanism 234 may allow for removal of the latch 14 from the buckle apparatus 16 when the withdrawal force applied to the latch 14 is greater than the predetermined value (or in some embodiments equal to the predetermined value). For instance, when the retention mechanism 234 is in the retention mode and the locking mechanism 232 is in the unlocked mode, the retention mechanism 234 may allow the latch 14 to withdraw from the insertion slot 228 of the casing 230 when the withdrawal force applied to the latch 14 is greater than the predetermined value. When in the retention mode, the predetermined value of the withdrawal force sufficient to withdraw the latch 14 from the retention mechanism 234 and/or associated buckle apparatus 16 may be greater than the tension provided by the seat belt retractor 24 on the seat belt webbing. Thus, the tension provided by the seat belt retractor 24 on the seat belt webbing may be less than the withdrawal force necessary to remove the latch 14 from the retention mechanism 234 when the retention mechanism 234 is in the retention mode.

The retention mechanism 234, in the release mode, may allow for removal of the latch 14 from the buckle apparatus 16 when the withdrawal force applied to the latch 14 is less than the predetermined value and the locking mechanism 232 is in the unlocked mode. For example, in the release mode, the retention mechanism 234 may allow the latch 14 to withdraw from the insertion slot 228 of the casing 230 when the withdrawal force applied to the latch 14 is less than the predetermined value and the locking mechanism 232 is in the unlocked mode. When the retention mechanism 234 is in the release mode, the tension applied by the seat belt retractor 24 on the seat belt webbing may be sufficient to remove the latch 14 from the buckle apparatus 16. Thus, when the locking mechanism 232 is in the unlocked mode and the retention mechanism 234 is transitioned to the release mode, the tension provided by the seat belt retractor 24 may automatically withdraw the latch 14 from the retention mechanism 234, the locking mechanism 232, the buckle apparatus 16, and/or the insertion slot 228 of the casing 230. Subsequently, the tension provided on the seat belt webbing by the seat belt retractor 24 may cause the seat belt webbing to retract within the seat belt retractor 24, freeing the occupant.

It should be appreciated that, regardless of the mode of the retention mechanism 234, the locking mechanism 232, in the locked mode, will remain engaged with, secured to, etc. the latch 14 when the withdrawal force applied on the latch 14 is greater than, equal to, and less than the predetermined value. Thus, when the locking mechanism 232 is in the locked mode, the latch 14 is not removable from the buckle apparatus 16 and/or the insertion slot 228 of the casing 230 thereof for any expected withdrawal force applied on the latch 14 (including the extreme withdrawal forces associated with a collision and/or rapid deceleration of the vehicle 10).

Described below are exemplary configurations, components, etc. of retention mechanisms of a buckle apparatus that may be utilized in association with embodiments of the buckle apparatus(s) 16 and/or the occupant restraint system 100 described herein. However, persons skilled in the art will appreciate that the present disclosure is equally applicable to additional or alternative retention mechanisms suitable to retain the latch 14 passively or selectively within the buckle apparatus 16 and/or the insertion slot 228 thereof when the withdrawal force is less than the predetermined value.

In one example, the retention mechanism 234 may also include one or more protrusions configured to operably engage with one or more apertures or indentions defined in the latch 14. In the retention mode, the protrusion(s) of the retention mechanism 234 may be received within the aperture(s) and/or indention(s) of the latch 14. Rather than being fixed relative to the casing 230 as the locking mechanism 232 may be in the locked mode, the protrusion(s) of the retention mechanism 234 may simply bias the latch 14 within the buckle apparatus 16 and/or the insertion slot 228 thereof. In some such embodiments, the protrusion(s) of the retention mechanism 234 may be allowed to rotate relative to the casing 230 and include a biasing element (spring or the like) to provide a retention force on the latch 14 counter to any withdrawal force and sufficient to retain the protrusion(s) of the retention mechanism 234 within the aperture(s) and/or indention(s) of the latch 14 when the withdrawal force is less than the predetermined value. Thus, the latch 14 may be retained within the insertion slot 228 of the casing 230 of the buckle apparatus 16 when the retention mechanism 234 is in the retention mode and the withdrawal force is less than the predetermined value. In the release mode of such a retention mechanism 234, the protrusion(s) of the retention mechanism 234 may be released/withdrawn from the aperture(s) and/or indention(s) of the latch 14, the retention force provided by the biasing element may be eliminated or reduced, or both. Thus, the latch 14 may be released or withdrawn from the insertion slot 228 of the casing 230 of the buckle apparatus 16 when a sufficient withdrawal force is applied to the latch (e.g., a withdrawal force less than the predetermined value as well as larger withdrawal forces), the retention mechanism 234 is in the release mode, and the locking mechanism 232 is in the unlocked mode.

In an additional or alternative embodiments, the retention mechanism 234 may include one or more retention plates configured to operably engage with the latch 14 (e.g., one or more faces or surfaces of the latch 14). In the retention mode, the retention plate(s) of the retention mechanism 234 may supply the retention force via friction fit with the latch 14. For example, the latch 14 may be sandwiched between two retention plates or between a retention plate and another face or surface of the buckle apparatus 16. In some such embodiments, a biasing element may provide at least a portion of the retention force and/or friction fit with the latch 14. Thus, the latch 14 may be retained within the insertion slot 228 of the casing 230 of the buckle apparatus 16 when the retention mechanism 234 is in the retention mode and the withdrawal force is less than the predetermined value. In the release mode of such a retention mechanism 234, the retention plate(s) of the retention mechanism 234 may be released/withdrawn from the face(s) and/or surface(s) of the latch 14, the retention force provided by the biasing element may be eliminated or reduced, or both. Thus, the latch 14 may be released or withdrawn from the insertion slot 228 of the casing 230 of the buckle apparatus 16 when a sufficient withdrawal force is applied to the latch (e.g., a withdrawal force less than the predetermined value as well as larger withdrawal forces), the retention mechanism 234 is in the release mode, and the locking mechanism 232 is in the unlocked mode.

In an additional or alternative embodiments, the retention mechanism 234 may include one or more retention magnets (e.g., ferrous materials, electromagnets, solenoids, magnets, or the like) configured to operably engage with one or more latch magnets of the latch 14. In the retention mode, a magnetic attraction between the retention magnet(s) and the latch magnet(s) may supply the retention force on the latch 14. Thus, the latch 14 may be retained within the insertion slot 228 of the casing 230 of the buckle apparatus 16 when the retention mechanism 234 is in the retention mode and the withdrawal force is less than the predetermined value. In some such embodiments, the retention magnet(s) and the latch magnet(s) may always supply the retention force on the latch 14 when the latch 14 is in proximity to retention mechanism 234 and/or when the latch 14 is inserted in the insertion slot 228. Additional or alternative embodiments of the retention mechanism 234 may also include the release mode. In the release mode, the position, orientation, or magnetic field provided by the retention magnet(s) may be altered to reduce and/or eliminate the magnetic attraction between the retention magnet(s) and the latch magnet(s) and thus reduce or eliminate the retention force provided by the retention mechanism 234 on the latch 14. Thus, the latch 14 may be released or withdrawn from the insertion slot 228 of the casing 230 of the buckle apparatus 16 when a sufficient withdrawal force is applied to the latch (e.g., a withdrawal force less than the predetermined value as well as larger withdrawal forces), the retention mechanism 234 is in the release mode, and the locking mechanism 232 is in the unlocked mode.

In an additional or alternative embodiments (see e.g., FIG. 3), the retention mechanism 234 may be a component of the locking mechanism 232 or a joint locking and retention apparatus/mechanism. In some embodiments, the retention mechanism 234 may provide the locking mechanism 232 and/or joint mechanism with a third mode, e.g., an unlocked and retained mode. In such embodiments, the locked mode of the locking mechanism 232 may operate as described above (e.g., the protrusion(s) of the locking mechanism 232 may be received within the aperture(s) and/or indention(s) of the latch 14 and fixed relative to the casing 230).

In the unlocked and retained mode, the protrusion(s) of the locking mechanism 232 may simply bias the latch 14 within the buckle apparatus 16 and/or the insertion slot 228 thereof. In some such embodiments, the protrusion(s) of may be allowed to rotate relative to the casing 230 and include or be associated with a biasing element to provide the retention force on the latch 14. Thus, the latch 14 may be retained within the insertion slot 228 of the casing 230 of the buckle apparatus 16 when the locking mechanism 232 is in the unlocked and retained mode and the withdrawal force is less than the predetermined value. In additional or alternative such embodiments, the retention mechanism 234 may provide the locking mechanism 232 and/or joint mechanism with a fourth mode, e.g., an unlocked and release mode. In the unlocked and release mode, the protrusion(s) of the locking mechanism 232 may be released/withdrawn from the aperture(s) and/or indention(s) of the latch 14, the retention force provided by the biasing element may be eliminated or reduced, or both. Thus, the latch 14 may be released or withdrawn from the insertion slot 228 of the casing 230 of the buckle apparatus 16 when a sufficient withdrawal force is applied to the latch (e.g., a withdrawal force less than the predetermined value as well as larger withdrawal forces) when the locking mechanism 232 and/or joint mechanism is in the unlocked and release mode.

It should be appreciated that transitioning the retention mechanism 234 between the retention and release modes, as used herein, may additionally or alternatively refer to transitioning the locking mechanism 232 and/or joint mechanism between and unlocked and retained mode and the unlocked and release mode.

Referring again generally to FIGS. 2-4, the buckle apparatus(s) 16 may include a traditional release element 240. As shown, the release element 240 may be at least partially arranged within the casing 230 and mechanically coupled (see mechanical link 233) with the locking mechanism 232. The release element 240 may be selectable to transition the locking mechanism 232 from the locked mode to the unlocked mode. In some embodiments and as shown in FIGS. 2 and 4, the release element 240 may be mechanically coupled (see mechanical link 235) with the retention mechanism 234 to transition the retention mechanism 234 from the retention mode to the release mode. In some embodiments and as shown in FIG. 3, the release element 240 may be mechanically coupled (see mechanical link 233) with the locking mechanism 232 and/or joint mechanism. In such configurations, the release element 240 may be selectable to transition the locking mechanism 232 and/or joint mechanism from the locked mode and/or the unlocked and retained mode to the unlocked and release mode.

In various embodiments, the buckle apparatus(s) 16 may be operable to transition the locking mechanism 232 and/or the retention mechanism 234 between their respective modes of operation in response to insertion of the latch 14. For example, insertion of the latch 14 within the insertion slot 228 may transition the locking mechanism 232 from the unlocked mode to the locked mode. Additionally or alternatively, insertion of the latch 14 within the insertion slot 228 may transition the retention mechanism 234 from the release mode to the retention mode.

As shown, the occupant restraint system 100 may further include a control unit 242 (e.g., an electronic control unit, multiple associated control units, and/or a combination of one or more processing devices and at least one memory or memory device as described herein) communicatively coupled to the buckle apparatus(es) 16 and configured to direct operation of one or more components, mechanisms, etc. of the buckle apparatus(s) 16. While a single control unit 242 is illustrated in FIGS. 2-4 for simplicity, it should be appreciated that the control unit 242 may include multiple associated control units that together are configured to provide operational control of the buckle apparatus(es) 16 as described in more detail below. In some embodiments and as shown, the control unit 242 may include or be communicatively coupled with one or more external devices 243 (e.g., a mobile device, cell phone, or the like). The mobile device 243 may communicate inputs to the control unit(s) 242 utilized to control operation of the buckle apparatus(es) 16.

As further shown in FIGS. 2-4, the locking mechanism 232 may be transitioned from the locked mode to the unlocked mode in response to a signal (e.g., electrical signal, modulated power supply, or the like) communicated to the locking mechanism 232. For example, the buckle apparatus(es) 16 may further include a locking actuator 236 operably coupled with the locking mechanism 232. The locking actuator 236 may transition the locking mechanism 232 from the locked mode to the unlocked mode in response to the signal communicated to the locking mechanism 232. Furthermore or alternatively, the locking actuator 236 may transition the locking mechanism 232 from the unlocked mode to the locked mode in response to a different signal communicated to the locking mechanism 232. The locking actuator 236 may include one or more linear actuators, rotary actuators, piezoelectric motors, amplified piezoelectric actuators, servomotors, shape memory alloy actuators, or the like.

In some embodiments and as illustrated in the exemplary embodiment of FIG. 4, the retention mechanism 234 may be transitioned from the retention mode to the release mode in response to a signal communicated to the retention mechanism 234. For instance, the buckle apparatus(es) 16 may include a retention actuator 438 operably coupled with the retention mechanism 234. The retention actuator 438 may transition the retention mechanism 234 from the retention mode to the release mode in response to the signal communicated to the retention mechanism 234. Furthermore or alternatively, the retention actuator 438 may transition the retention mechanism 234 from the release mode to the retention mode in response to a different signal communicated to the retention mechanism 234. The retention actuator 438 may include one or more linear actuators, rotary actuators, piezoelectric motors, amplified piezoelectric actuators, servomotors, shape memory alloy actuators, or the like.

Referring now to FIG. 5, a schematic diagram of an exemplary embodiment of an occupant restraint system is illustrated in accordance with aspects of the present subject matter. The occupant restraint system 100 may include one or more seat belt assemblies configured the same or similar to one or more of the seat belt assemblies 15 described with respect to FIGS. 1-4 or suitably configured seat belt assemblies 15. While the occupant restraint system 100 of FIG. 5 illustrates an exemplary number of seat belt assemblies 15 and associated components (e.g., seats 11, buckle apparatus(es) 16), the occupant restraint system 100 may include any other suitable seat belt assemblies 15, number of seats, rows of seats, seats per row, doors, rows of doors, etc. Furthermore and as shown, each seat belt assembly 15 may include the buckle apparatus 16 (e.g., any of the buckle apparatuses 16 described with respect to FIGS. 2-4, other suitably configured buckle apparatuses, the same configuration of the buckle apparatus 16 for each seat belt assembly 15, or differently configured buckle apparatuses 16 for at least two seat belt assemblies 15). For example, each buckle apparatus 16 may include the locking mechanism 232 and/or the retention mechanism 234 (each omitted from FIG. 5 for clarity).

As shown, the control unit 242 may provide operational control of the seat belt apparatuses 16 of the occupant restraint system 100 and may be communicatively coupled with various additional or alternative components of the vehicle 10, as described in more detail below. While some communication links in FIG. 5 may be illustrated as joint communication links, it should be appreciated that one or more components communicatively coupled to the control unit 242, such as all of the components, may have component dedicated communication links.

By applying an appropriate algorithm in the control unit 242, the occupant restraint system 100 can be integrated with the rest of the vehicle systems, with input from/output to a vehicle transmission 544, a vehicle power supply 546, an infotainment unit or system (infotainment unit 548), one or more door mechanisms 550, and/or one or more occupant sensors 552 (e.g., internal occupant sensors 552A and/or external occupant sensors 552B), and/or one or more external devices 243, such as a mobile phone, that includes a mobile application and/or a cloud application configured to provide external information to the control unit 242, such as occupant profile information and/or instructions associated with an occupant identification module/method, as described in more detail herein. In some embodiments, besides controlling the operation of the buckle apparatuses 16 in the occupant restraint system 100, the control unit 242 mays also provide useful information to the driver, either directly to the infotainment unit 548, such as a display thereof, or the external device(s) 243, such as a user interface 545 thereof. The user interface 245 of the external device(s) 243 and/or the infotainment unit 548 may include one or more buttons, switches, touch screen capability, or the like allowing a user, occupant, operator, etc. to communicate inputs to the control unit 242 utilized to control operation of the occupant restraint system 100 and/or the buckle apparatus(es) 16, at least in part.

As shown, the occupant restraint system 100 may include one or more door mechanisms 550, such as one door mechanism 550 associated with each door of the vehicle 10 and/or one door mechanism 550 for each door associated with one or more seat belt assemblies 15. Some embodiments of the door mechanism 550 may include a sensor, circuit, or the like suitable to communicate a signal indicative of whether the associated door is open or closed. Additionally or alternatively, embodiments of the door mechanism 550 may include a sensor, circuit, or the like suitable to communicate a signal indicative of whether a child-lock mode or mechanism (e.g., a mechanical child-lock manually actuatable or an electronically controlled child lock mechanism) of the associated door is engaged or disengaged. Some embodiments of the door mechanism 550 may include a child-lock actuator controllable by the control unit 242 to transition the child-lock mechanism between the engaged and disengaged modes based on input received by the control unit 242, e.g., as provided by the infotainment unit 548 and/or the external device(s) 243. As shown, the occupant restraint system 100 may include one or more internal occupant sensors 552A, such as one or more internal occupant sensors 552A associated with each seat 11 of the vehicle 10 and/or one or more internal occupant sensors 552A for each seat associated with one or more seat belt assemblies 15.

The internal occupant sensor(s) 552A may generally be configured to communicate one or more signals indicative of, without limitation, one or more qualities of an occupant seated within the seat of the associated seat belt assembly 15 (e.g., height; skin tone; hair color, hair length, hair style, or degree of baldness; clothing style; occupants voice and/or speech patterns; occupant weight or BMI estimation; occupant behavior; occupant physical challenges, disabilities, assistive technologies, injuries, etc.; the occupant's status as impaired, intoxicated, moderately to highly medicated, etc.; and/or whether the occupant has one or both hands free or usable for interaction with the associated seat belt assembly 15); and/or the identity of the occupant. The internal occupant sensor(s) 552A may include, without limitation, one or more audio sensors, optical sensors, RADAR sensors, LIDAR sensors, inferred sensors, other sensors suitable to transmit and/or receive suitable electromagnetic signals/waves, acoustic sensors, RFID transceivers/receivers, proximity sensors, weight sensors (e.g., a weight sensor embedded or provided in association with the seat 11), and/or the like.

In some additional or alternative embodiments, the occupant restraint system 100 may include one or more external occupant sensors 552B, such as one or more external occupant sensors 552B associated with each door of the vehicle 10 and/or one or more external occupant sensors 552B for each door associated with one or more seat belt assemblies 15. The external occupant sensor(s) 552B may generally be configured to communicate one or more signals indicative of, without limitation, that an occupant has approached the associated door; one or more qualities of an occupant within proximity of the door (e.g., height; skin tone; hair color, hair length, hair style, or degree of baldness; clothing style; occupants voice and/or speech patterns; occupant weight or BMI estimations; occupant behavior; occupant physical challenges, disabilities, assistive technologies, injuries, etc.; the occupant's status as impaired, intoxicated, moderately to highly medicated, etc.; and/or whether the occupant has one or both hands free or usable for interaction with the associated seat belt assembly 15); and/or the identity of the occupant. The external occupant sensor(s) 552B may include, without limitation, one or more audio sensors, optical sensors, RADAR sensors, LIDAR sensors, inferred sensors, other sensors suitable to transmit and/or receive suitable electromagnetic signals/waves, acoustic sensors, RFID transceivers/receivers, proximity sensors, and/or the like.

The control unit 242 may communicate a signal to the locking actuator(s) 236 of the associated locking mechanism(s) 232 to cause the locking mechanism(s) 232 to transition from the locked mode to the unlocked mode in response to a communication indicative that one or more prerequisite conditions associated with the buckle apparatus(es) 16 have been satisfied. In some embodiments, the prerequisite condition(s) may include one or more of the transmission 544 of the vehicle 10 being transitioned to a park setting, the vehicle 10 being transitioned from an on setting to an off setting (e.g., entirely off, a low-power accessory mode or setting, and/or a high-power accessory mode or setting), a door associated with an operator's seat 11 of the vehicle 10 being opened, a door(s) associated with the buckle apparatus(es) 16 being opened, the door associated with the buckle apparatus(es) 16 being approached by another occupant of the vehicle 10, the door associated with the buckle apparatus(es) 16 having the child-lock mode engaged, selecting the unlocked mode for the seat belt assembly (ies) 15 and/or the associated locking mechanism(s) 232 of the buckle apparatus(es) 16 via the infotainment unit 548 and/or external device(s) 243 associated with the vehicle 10, or a determination that the occupant restraint system 100 for the vehicle 10 may be safely disengaged (e.g., the control unit 242 may determine that the vehicle 10 is not upside down as indicated by one or more accelerometers, gyroscopes, or the like prior to transitioning the locking mechanism(s) 232 from the locked mode to the unlocked mode).

Additionally or alternatively, the control unit 242 may communicate a different signal(s) to the locking actuator(s) 236 of the associated locking mechanism(s) 232 to cause the locking mechanism(s) 232 to transition from the unlocked mode to the locked mode in response to a communication indicative of one or more of the transmission 544 of the vehicle 10 being transitioned to a setting other than park, the door associated with the operator's seat 11 of the vehicle 10 being closed, the door(s) associated with the buckle apparatus(es) 16 being closed, selecting the locked mode for the seat belt assembly (ies) 15 and/or the associated locking mechanism(s) 232 of the buckle apparatus(es) 16 via the infotainment unit 548 and/or external device(s) 243 associated with the vehicle 10, or the door associated with the buckle apparatus(es) 16 having the child-lock mode engaged.

Furthermore, or alternatively, the control unit 242 may communicate a signal(s) to the retention actuator(s) 438 of the associated retention mechanism(s) 234 to cause the retention mechanism(s) 234 to transition from the retention mode to the release mode in response to a communication indicative that one or more prerequisite retention conditions associated with the buckle apparatus(es) 16 have been satisfied. In some embodiments, the prerequisite retention condition(s) may include one or more of the door associated with an operator's seat 11 of the vehicle 10 being opened, the door(s) associated with the buckle apparatus(es) 16 being opened, the door(s) associated with the buckle apparatus(es) 16 being approached by another occupant of the vehicle 10, the door(s) associated with the buckle apparatus(es) 16 having the child-lock mode engaged, or selecting the release mode for the seat belt assembly (ies) 15 and/or the associated retention mechanism(s) 234 of the buckle apparatus(es) 16 via the infotainment unit 548 and/or external device(s) 243 associated with the vehicle 10.

Additionally or alternatively, the control unit 242 may communicate a different signal(s) to the retention actuator(s) 438 of the associated retention mechanism(s) 234 to cause the retention mechanism(s) 234 to transition from the release mode to the retention mode in response to a communication indicative of selecting the retention mode for the seat belt assembly (ies) 15 and/or the associated retention mechanism(s) 234 of the buckle apparatus(es) 16 via the infotainment unit 548 and/or external device(s) 243 associated with the vehicle 10, the vehicle 10 being transitioned from the off setting to the on setting, the transmission 544 of the vehicle 10 being transitioned to a setting other than park, the door associated with an operator's seat 11 of the vehicle 10 being closed, the door(s) associated with the buckle apparatus(es) 16 being closed, or the door(s) associated with the buckle apparatus(es) 16 being in the child-lock mode.

Figure 6:
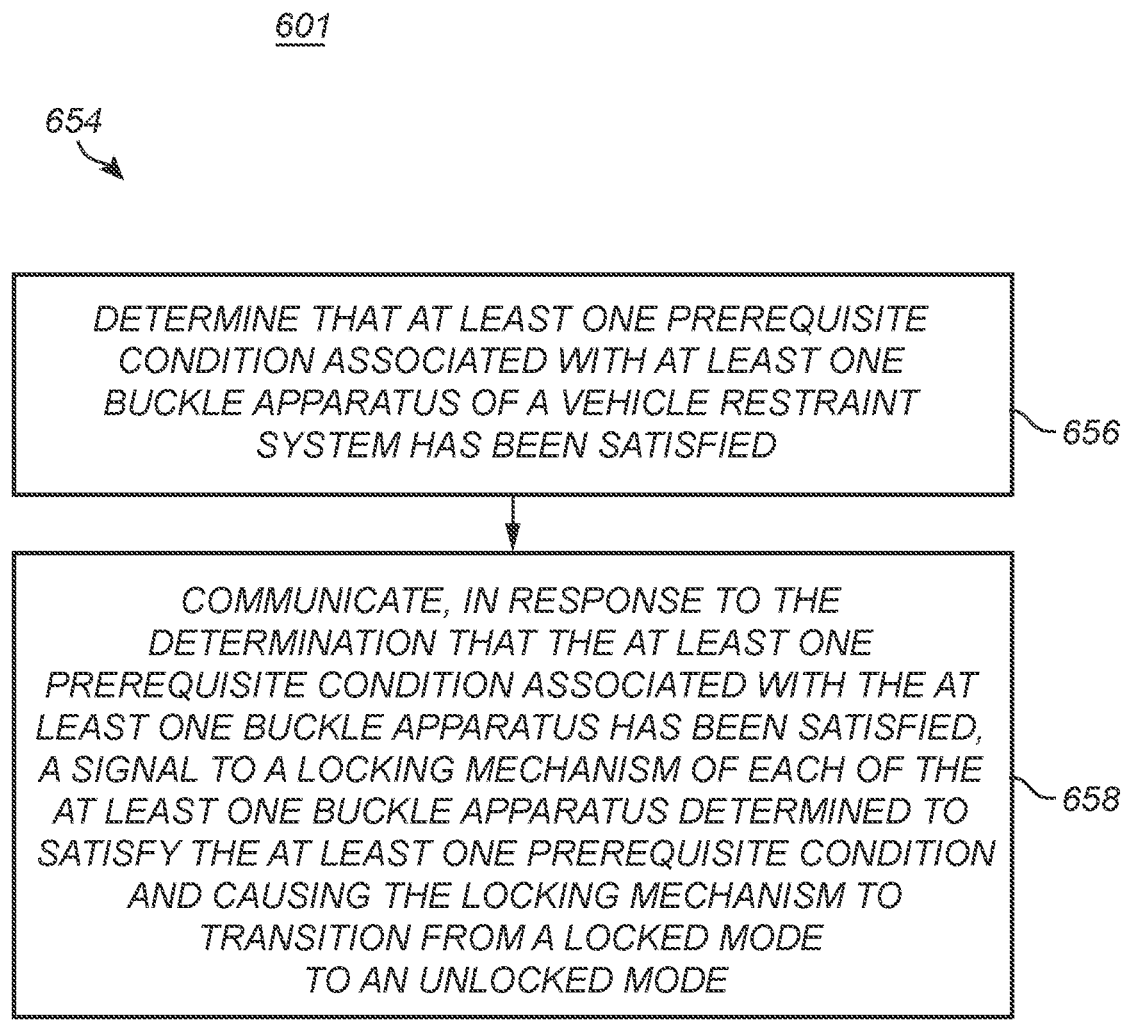
FIG. 6 illustrates an exemplary embodiment of a method for controlling operation of an occupant restraint system, in accordance with aspects of the present subject matter.

Referring now to FIG. 6, one exemplary embodiment of a method for controlling operation of an occupant restraint system is illustrated in accordance with aspects of the present disclosure. The method or process (method 654) may be implemented utilizing or in conjunction with embodiments of the occupant restraint system 100, the vehicle 10, and/or the buckle apparatus(es) 16 described herein or other similar or suitably configured occupant restraint systems, vehicles, and buckle apparatus(es). For some embodiments, the steps and/or elements (steps) of the method 654 may include receiving a communication indicative of the status of prerequisite condition(s) associated with the buckle apparatus(es) of the occupant restraint system.

As shown and for some embodiments, the steps include determining that one or more prerequisite conditions associated with the buckle apparatuses(es) of the occupant restraint system have been satisfied (step 656), as described herein. The steps may further include communicating, in response to the determination that the prerequisite condition(s) associated with the buckle apparatus(es) has been satisfied, a signal to a locking mechanism of each of the buckle apparatus(es) determined to satisfy the prerequisite condition(s) and causing the locking mechanism(s) to transition from a locked mode to an unlocked mode (step 658). In an additional or alternative embodiment, the steps may further include communicating a different signal(s) to the locking mechanism(s) of the buckle apparatus(es) to cause the locking mechanism(s) to transition from the unlocked mode to the locked mode in response to a communication indicative that one or more of a transmission of the vehicle being transitioned to a setting other than park, a door associated with an operator's seat of the vehicle being closed, a door(s) associated with the buckle apparatus(es) being closed, selecting the locked mode for the seat belt assembly (ies) and/or the associated locking mechanism(s) of the buckle apparatus(es) via an infotainment unit and/or one or more external devices associated with the vehicle, or the door(s) associated with the buckle apparatus(es) having the child-lock mode engaged.

In some embodiments, the steps may further include receiving a communication indicative of the status of one or more prerequisite retention conditions associated with the buckle apparatus(es) of the occupant restraint system. In an additional or alternative embodiment, the steps may further include determining that the prerequisite retention condition(s) associated with the buckle apparatus(es) has been satisfied, as described herein. In further or alternative embodiments, the steps may include communicating, in response to the determination that the prerequisite retention condition(s) associated with the buckle apparatus(es) has been satisfied, a signal(s) to the retention mechanism(s) of the associated buckle apparatus(es) determined to satisfy the prerequisite retention condition(s) and causing the retention mechanism(s) to transition from a retention mode to a release mode, as described herein. In an additional or alternative embodiment, the steps may further include communicating a different signal(s) to the associated retention mechanism(s) to cause the associated retention mechanism(s) to transition from the release mode to the retention mode in response to a communication indicative of selecting the retention mode for the seat belt assembly (ies) and/or the associated retention mechanism(s) of the buckle apparatus(es) via the infotainment unit and/or the external devices(s) associated with the vehicle, the vehicle being transitioned from the off setting to the on setting, the transmission of the vehicle being transitioned to a setting other than park, the door associated with the operator's seat of the vehicle being closed, the door(s) associated with buckle apparatus(es) being closed, or the door(s) associated with the buckle apparatus(es) being in the child-lock mode.

Figure 7:
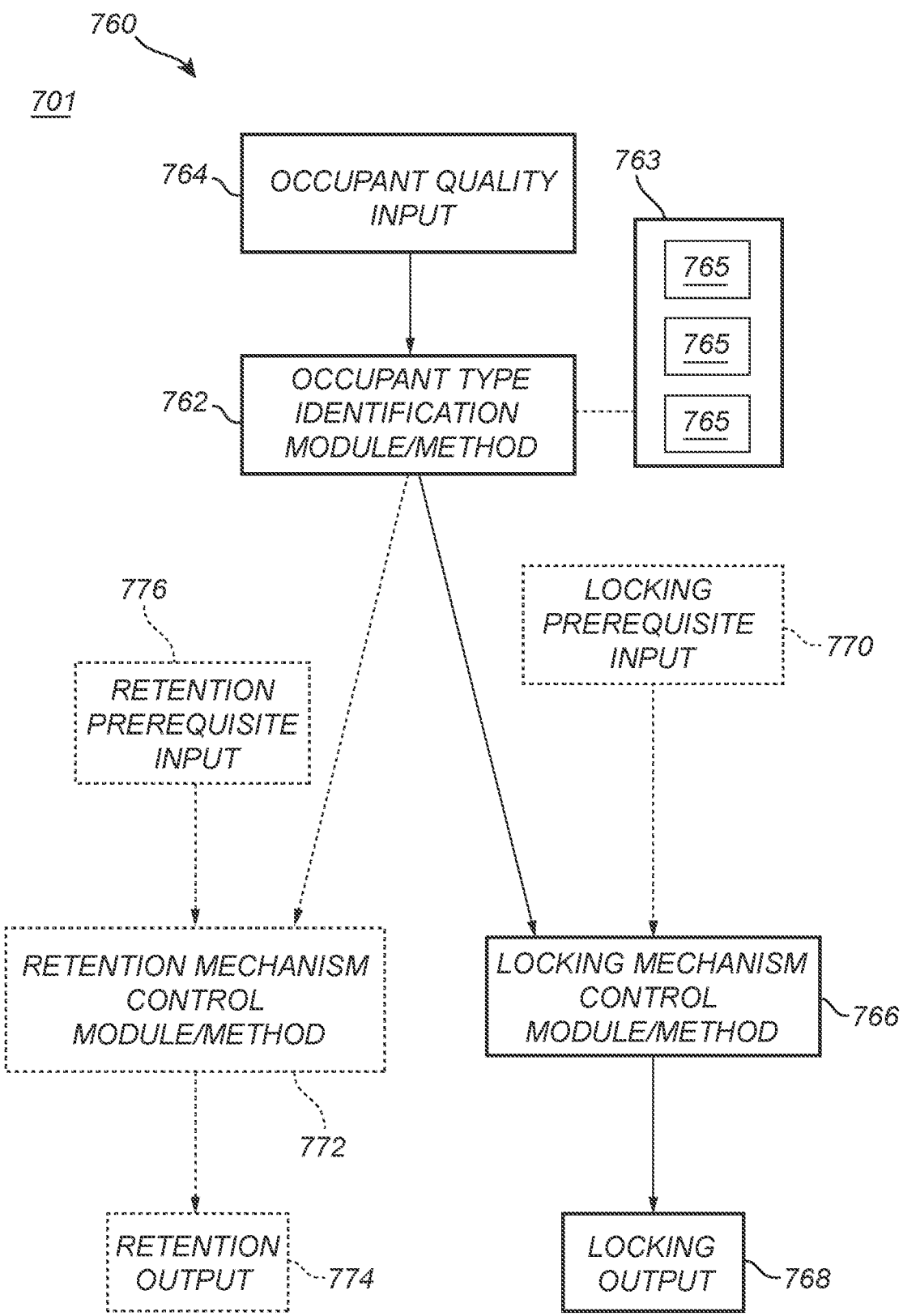
FIG. 7 illustrates a schematic diagram of an exemplary embodiment of a system for operating a configurable buckle apparatus, in accordance with aspects of the present subject matter.

FIG. 7 illustrates a schematic diagram of an exemplary embodiment of a system for operating a configurable buckle apparatus and/or an occupant restraint system in accordance with aspects of the present subject matter. Referring now to FIG. 7 in combination with FIG. 5, the system 760 may be utilized to control or in association with embodiments of the occupant restraint system 100, the vehicle 10, and/or configurable buckle apparatus(es) (e.g., any of the buckle apparatuses 16 described with respect to FIGS. 2-4, the same configuration of the buckle apparatus 16 for each seat 11 and/or seat belt assembly 15, or differently configured buckle apparatuses 16 for at least two seats 11 and/or seat belt assemblies 15) described herein or other similar or suitably configured occupant restraint systems, vehicles, and buckle apparatus(es). The system 760 may include one or more modules including instructions stored in at least one memory and executable by one or more processors to cause the processor(s) to implement steps, method elements, or the like as described herein.

As shown, the system 760 may include an occupant type identification module and/or method (occupant type identification module 762) configured to determine, based on data indicative of one or more occupant qualities (e.g., occupant quality input 764 of FIG. 7) of an occupant seated in, about to be seated in, and/or associated with a seat 11 of the vehicle 10, the respective occupant's status as an assisted occupant or an unassisted occupant. Additionally or alternatively, determining the occupant's status as an assisted occupant may include determining that the occupant is one or more of a minor, a pet, incapacitated, or has a physical disability. Generally, the assisted occupant status indicates that the respective occupant may have difficulty to or is unable to reach or manually operate the buckle apparatus(es) 16. In some embodiments, the assisted occupant status may indicate that the respective occupant is likely to try and escape the vehicle 10 without permission from an associated guardian (e.g., for rowdy children), an owner (e.g., for pets), assistant, operator of the vehicle 10, and/or other occupant of the vehicle 10. In additional or alternative embodiments, the assisted occupant status may indicate that the associated guardian, owner, assistant, operator of the vehicle 10, and/or other occupant of the vehicle 10 may have difficulty to or is unable to reach or manually operate the buckle apparatus(es) 16. For instance, a parent or guardian suffering from a permanent or temporary injury and/or disability may find it extremely challenging or impossible to reach over a child in a seat 11 to manually unlock the associated buckle apparatus 16.

In some alternative or further embodiments, the occupant type identification module 762 may be configured to determine the status of an occupant seated in, about to be seated in, and/or associated with a seat 11 of the vehicle 10 as a retained occupant or an unretained occupant based on the data 764 indicative of the occupant quality (ies). Additionally or alternatively, determining the occupant's status as a retained occupant may include determining that the occupant is one or more of a minor, a pet, incapacitated, or has a physical disability. Generally, the retained occupant status indicates that the respective occupant may have difficulty to or is unable to manually pull the associated latch 14 from the associated buckle apparatus 16 and/or pull the seat belt webbing(s) across his/her/its body to a sufficient degree to allow the seat belt webbing(s) to retract within the seat belt retractor(s) 24.

In some embodiments, the retained occupant status indicates that the respective occupant may have difficulty to or is unable to pull the seat belt webbing(s) from the seat belt retractor(s) 24, pull the seat belt webbing(s) across his/her/its body to a sufficient degree to allow insertion of the latch 14 within the associated buckle apparatus 16, and/or insert the latch 14 within the insertion slot 228 of the buckle apparatus 16. Thus and in some embodiments, the retained occupant status may indicate that the respective occupant, associated guardian, assistant, operator of the vehicle 10, and/or other occupant of the vehicle 10 desires or requires the respective occupant to remain seated within the seat 11 and with the associated latch 14 retained within the insertion slot 228 of the associated buckle apparatus 16. Thus, the locking mechanism 232 of the associated buckle apparatus 16 may be transitioned from the unlocked mode to the locked mode without manually having to reinsert or reposition the associated latch 14 within the buckle apparatus 16 and/or insertion slot 228 thereof. It should be appreciated that a parent, guardian, or the like suffering from a permanent or temporary injury and/or disability may find it extremely challenging or impossible to pull the latch 14 and associated seat belt webbing(s) across an occupant in the seat 11 to manually reinsert the latch 14 within the associated buckle apparatus 16.

As shown, the data 764 indicative of the occupant quality (ies) may be communicated to the occupant type identification module 762. As described above with respect to FIG. 5, the data 764 may be communicated from one or more of the occupant sensors 552 (e.g., one or more internal occupant sensors 552A and/or external occupant sensors 552B), one or more of the door mechanisms 550 (e.g., a sensor or circuit indicating the mode of the associated child-lock), the infotainment unit 548, and/or the external device(s) 243. In at least one embodiment, the occupant identification module may include or be associated with one or more artificial intelligence programs. For example, determining the occupant's status as an assisted occupant or an unassisted occupant may include determining the occupant's status as an assisted occupant or an unassisted occupant utilizing the artificial intelligence algorithm(s) and based on the data 764 indicative of the occupant quality (ies) of the occupant seated within the seat 11 of the vehicle 10. Additionally or alternatively, determining the occupant's status as a retained occupant or an unretained occupant may include determining the occupant's status as a retained occupant or an unretained occupant utilizing the artificial intelligence algorithm(s) and based on the data 764 indicative of the occupant quality (ies) of the occupant seated within the seat 11 of the vehicle 10.

The artificial intelligence algorithms(s) may include one or more algorithms, programs, modules, and the like suitable to simulate intelligence human behavior or perform tasks historically requiring human implementation. For example, the artificial intelligence algorithms may include, without limitation, one or more of machine learning algorithms, artificial neural networks, recurrent artificial neural networks, feedforward neural networks, convolutional neural networks, recurrent neural networks, deep neural networks, long short term memory networks, inductive logic programming algorithms, support vector machines, clustering algorithms, Bayesian networks, reinforcement learning algorithms, representation learning algorithms, similarity and metric learning algorithms, sparse dictionary learning algorithms, genetic algorithms, k-nearest neighbor (KNN) algorithms, decision tree learning algorithms, association rule learning algorithms, and the like. Some of the artificial intelligence algorithms described herein may be trained (via a supervised or unsupervised training process) based on training data provided to the artificial intelligence algorithms. Thus, the artificial intelligence algorithm(s) may generally be utilized to determine an occupant's status as an assisted or unassisted occupant and/or the occupant's status as a retained or unretained occupant, based at least in part on the data 764 indicative of the occupant quality (ies).

As shown in FIG. 7 and for some embodiments, the occupant type identification module 762 may be communicatively coupled to an occupant profile repository 763 (e.g., as stored in one or more memories, memory devices, or the like as described herein). The occupant profile repository 763 may include data associated with multiple occupant profiles 765. While three occupant profiles 765 are included for illustrative purposes in FIG. 7, it should be appreciated that the occupant profile repository 763 may include data associated with numerous additional occupant profiles 765 or fewer occupant profiles 765. In some embodiments, the occupant profile repository 763 may only include data of occupant profiles 765 associated with the vehicle 10 and/or with an operator, owner, etc. of the vehicle 10. However, the occupant repository 763 may include occupant profiles 765 associated with different vehicles 10 and/or different operators, owners, etc. For example, some embodiments of the system 760 may allow for accessing occupant qualities of a guest occupant of a different vehicle indicated by the occupant profile 765 of the guest occupant and stored in a joint or master occupant profile repository 763. In some additional or alternative embodiments the occupant quality data and/or the occupant quality data associated with the occupant profiles 765 stored in the occupant profile repository 763 may be utilized to train suitable artificial intelligence algorithms of the occupant identification module 762.

In some embodiments, the occupant type identification module 762 may compare the data 764 indicative of the occupant quality (ies) with multiple occupant profiles 765 and identify the occupant profile 765 associated with the data 764 indicative of the occupant quality (ies) in order to determine the occupant's status as an assisted occupant or an unassisted occupant. For example, the occupant type identification module 762 may determine the occupant's status as an assisted occupant or an unassisted occupant based on the data 764 indicative of the occupant quality (ies) and a history of occupant behavior indicated by the occupant profile 765 identified as associated with the respective occupant. In some further or alternative configurations, the occupant type identification module 762 may utilize the identified occupant profile 765 in order to determine the occupant's status as a retained or unretained occupant. For example, the occupant type identification module 762 may determine the occupant's status as a retained occupant or an unretained occupant based on the data 764 indicative of the occupant quality (ies) and the history of occupant behavior indicated by the occupant profile 765 identified as associated with the respective occupant.

In some embodiments, the data of the history of occupant behavior indicated by the occupant profile(s) 765 may include data indicative of a door(s) associated with the occupant(s) of the occupant profile(s) 765 being in a child-lock mode, a frequency of the door(s) associated with the occupant(s) of the occupant profile(s) 765 being in the child-lock mode, a buckle apparatus(es) 16 associated with the occupant(s) of the occupant profile(s) 765 being set to the locked mode selectable via the infotainment unit 548 of the vehicle 10 and/or the external device(s) 243, a frequency of the buckle apparatus(es) 16 associated with the occupant(s) of the occupant profile(s) 765 being set to the locked mode selectable via the infotainment unit 548 of the vehicle 10 and/or the external device(s) 243, the retention mechanism(s) 234 of the buckle apparatus(es) 16 associated with the occupant(s) of the occupant profile(s) 765 being set to the retention mode selectable via the infotainment unit 548 of the vehicle 10 and/or the external device(s) 243, a frequency of the retention mechanism(s) 234 of the buckle apparatus(es) 16 associated with the occupant(s) of the occupant profile(s) 765 being set to the retention mode selectable via the infotainment unit 548 of the vehicle 10 and/or the external device(s) 243, or prior determined occupant qualities of the occupant associated with the occupant profile 765.

However, it should be appreciated that one or more of the occupant profiles 765 may indicate a prior determination or designation of the associated occupant as an assisted passenger, unassisted passenger, a retained passenger, and/or an unretained passenger. Thus, and in some embodiments, identification of occupant profile 765 associated with a particular occupant may be sufficient to determine the particular occupant's status as an assisted or unassisted occupant and/or as a retained or unretained occupant.

Referring now to FIGS. 5 and 7 in combination with any of the buckle apparatuses 16 of FIGS. 2-4 or similarly or suitable configured buckle apparatus(es), the system 760 may further include a locking mechanism control module and/or method (locking mechanism control module 766) configured to communicate a signal (see, e.g., locking output 768 of FIG. 7) to the locking mechanism(s) 232 of the buckle apparatus(es) 16 to cause the locking mechanism(s) 232 to transition from the locked mode to the unlocked mode in response to the determination of the assisted occupant(s), as described herein.

In some embodiments, the locking mechanism control module 766 may further be configured to determine that one or more prerequisite conditions associated with the buckle apparatus(es) 16 of the seat(s) 11 and/or the seat belt assembly (ies) 15 have been satisfied (as indicated by locking prerequisite input 768) prior to communicating the signal(s) (e.g., locking output 768) to the locking mechanism(s) 232 of the buckle apparatus(es) 16 to cause the locking mechanism(s) 232 to transition from the locked mode to the unlocked mode, as described herein. As described above with respect to FIG. 5, the data 770 may be communicated from one or more of the occupant sensors 552 (e.g., one or more internal occupant sensors 552A and/or external occupant sensors 552B), one or more of the door mechanisms 550, the infotainment unit 548, the external device(s) 243, the vehicle power supply 546, and/or the vehicle transmission 544. In some embodiments, the prerequisite condition(s) may include one or more of the transmission 544 of the vehicle 10 being transitioned to the park setting, the vehicle 10 being transitioned from the on setting to the off setting, the door associated with the operator's seat 11 of the vehicle 10 being opened, the door(s) associated with the buckle apparatus(es) 16 being opened, the door(s) associated with the buckle apparatus(es) 16 being approached by another occupant of the vehicle 10, or the determination that the occupant restraint system 100 for the vehicle 10 may be safely disengaged (e.g., the control unit 242 may determine that the vehicle is not upside down as indicated by one or more accelerometers, gyroscopes, or the like prior to transitioning the locking mechanism(s) 232 from the locked mode to the unlocked mode).

In some such embodiments or differently configured embodiments, the locking mechanism control module 766 may communicate one or more different signal(s) (as also represented by, e.g., locking output 768 of FIG. 7) to the locking mechanism(s) 232 of the buckle apparatus(es) 16 to cause the locking mechanism(s) 232 to transition from the unlocked mode to the locked mode in response to the determination of the assisted occupant(s) and one or more of the transmission 544 of the vehicle 10 being transitioned to a setting other than park, the door associated with the operator's seat 11 of the vehicle 10 being closed, or the door(s) associated with the buckle apparatus(es) 16 being closed.

Referring again to FIGS. 5 and 7 in combination with any of the buckle apparatuses 16 of FIGS. 2-4 or similarly or suitable configured buckle apparatus(es), the system 760 may further include a retention mechanism control module and/or method (retention mechanism control module 772) configured to communicate a signal (see, e.g., retention output 774 of FIG. 7) to the retention mechanism(s) 234 of the buckle apparatus(es) 16 to cause the retention mechanism(s) 234 to transition from the retained mode to the release mode in response to the determination of the retained occupant(s), as described herein.

In some further or alternative embodiments, the retention mechanism control module 772 may be configured to determine that one or more prerequisite retention conditions associated with the buckle apparatus(es) 16 of the seat(s) 11 and/or the seat belt assembly (ies) 15 has been satisfied (as indicated by retention prerequisite input 776) prior to communicating the signal(s) (e.g., retention output 774) to the retention mechanism(s) 234 of the buckle apparatus(es) 16 to cause the retention mechanism(s) 234 to transition from the retained mode to the release mode, as described herein. As described above with respect to FIG. 5, the data 776 may be communicated from one or more of the occupant sensors 552 (e.g., one or more internal occupant sensors 552A and/or external occupant sensors 552B), one or more of the door mechanisms 550, the infotainment unit 548, the external device(s) 243, the vehicle power supply 546, and/or the vehicle transmission 544. In some such embodiments, the prerequisite retention condition(s) may include one or more of a door of the door associated with an operator's seat 11 of the vehicle 10 being opened, the door(s) associated with the buckle apparatus(es) 16 being opened, or the door(s) associated with the buckle apparatus(es) 16 being approached by another occupant of the vehicle 10, In additional or alternative embodiments, the retention mechanism control module 772 may be configured to communicate one or more different signals (as also represented by, e.g., retention output 774 of FIG. 7) to the retention mechanism(s) 234 of the buckle apparatus(es) 16 to cause the retention mechanism(s) 234 to transition from the release mode to the retention mode in response to the determination of the retained occupant(s) and one or more of the vehicle 10 being transitioned from the off setting to the on setting, the transmission 544 of the vehicle 10 being transitioned to a setting other than park, the door associated with an operator's seat 11 of the vehicle 10 being closed, or the door(s) associated with the buckle apparatus(es) 16 being closed Referring now to FIG. 8, one exemplary embodiment of a method for controlling a system for operating one or more configurable buckle apparatuses of an occupant restraint system is illustrated in accordance with aspects of the present disclosure. The method or process (method 874) may be implemented utilizing or in conjunction with embodiments of the system 760 for operating/controlling a configurable buckle apparatus or occupant restraint system, the occupant restraint system 100, the vehicle 10, and/or the buckle apparatus(es) 16, as described herein, or other similar or suitably configured occupant restraint systems, vehicles, buckle apparatus(es), and/or systems for operating/controlling the same. For some embodiments and as shown, the steps and/or elements (steps) of the method 878 may include receiving data indicative of one or more occupant qualities of an occupant seated within a seat of a vehicle (step 880), as described herein.

As shown in step 882, the method 878 may include determining the occupant's status as an assisted occupant or an unassisted occupant based on the received data, as described herein. Additionally or alternatively, determining the occupant's status as an assisted occupant may include determining that the occupant is one or more of a minor, a pet, incapacitated, or has a physical disability/injury, as described herein. In some such embodiments or alternative embodiments, determining the occupant's status as an assisted occupant may include determining the occupant's status as an assisted occupant or an unassisted occupant based on the received data and utilizing an artificial intelligence algorithm, as described herein. In some embodiments, determining the occupant's status as an assisted occupant may include comparing the data indicative of the occupant quality (ies) with multiple occupant profiles and identifying an occupant profile associated with the data indicative of the occupant quality (ies). Furthermore, determining the occupant's status as an assisted occupant or an unassisted occupant may be based on the data indicative of the occupant quality (ies) and a history of occupant behavior indicated by the associated occupant profile.

Figure 8:
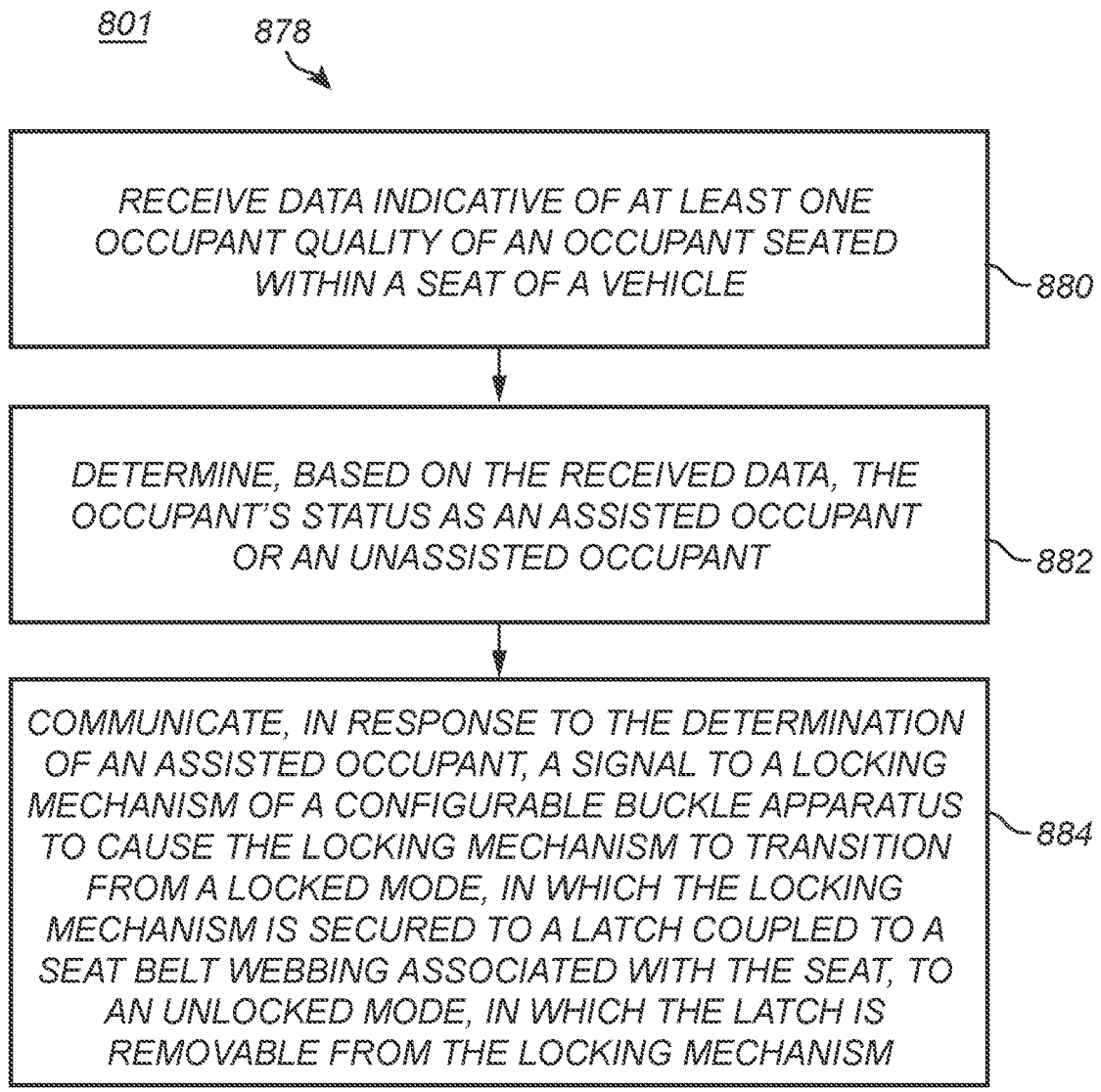
FIG. 8 illustrates an exemplary embodiment of a method for controlling a system for operating one or more configurable buckle apparatuses of an occupant restraint system, in accordance with aspects of the present subject matter.

As further shown in FIG. 8 and for some embodiments, the method 878 may include communicating, in response to the determination of an assisted occupant, a signal to a locking mechanism of a configurable buckle apparatus to cause the locking mechanism to transition from a locked mode to an unlocked mode (step 884), as described herein.

Some embodiments of the method 878 may additionally or alternatively include determining the occupant's status as a retained occupant or an unretained occupant based on the data indicative of the occupant quality (ies) of the occupant seated within the vehicle. For example, determining the occupant's status as a retained occupant or an unretained occupant may include comparing the data indicative of the occupant quality (ies) with the multiple occupant profiles and identifying an occupant profile associated with the data indicative of the occupant quality (ies). The occupant's status as a retained occupant or an unretained occupant may be determined based on the data indicative of the occupant quality (ies) and the history of occupant behavior indicated by the associated occupant profile. Additionally or alternatively, the method may include communicating a signal to the retention mechanism of the configurable buckle apparatus to cause the retention mechanism to transition from a retained mode to a release mode in response to the determination of the retained occupant, as described herein.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 9:
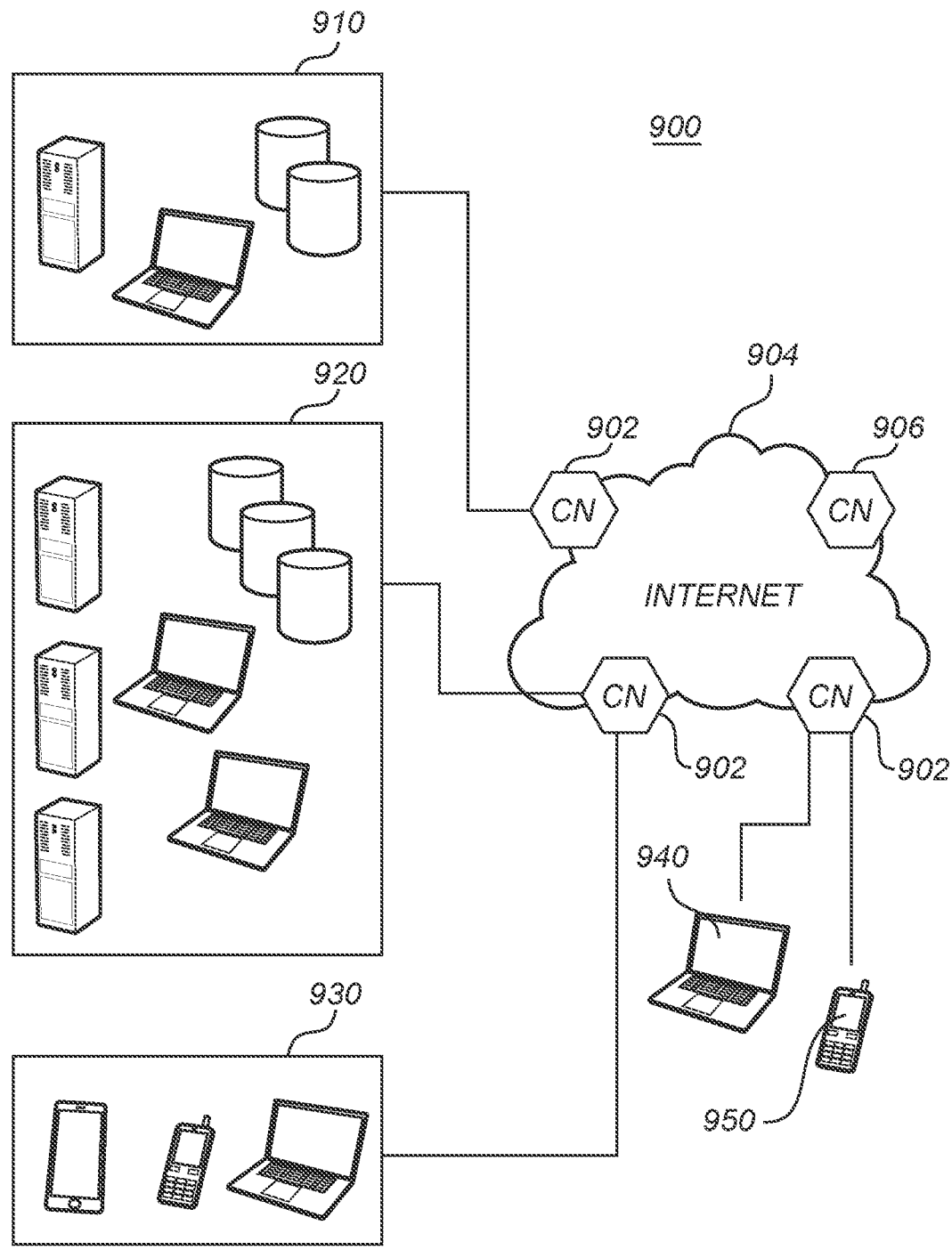
FIG. 9 illustrates a schematic diagram of an exemplary embodiment of a network of a cloud-based system for implementing various cloud-based services, in accordance with aspects of the present subject matter.
Figure 10:
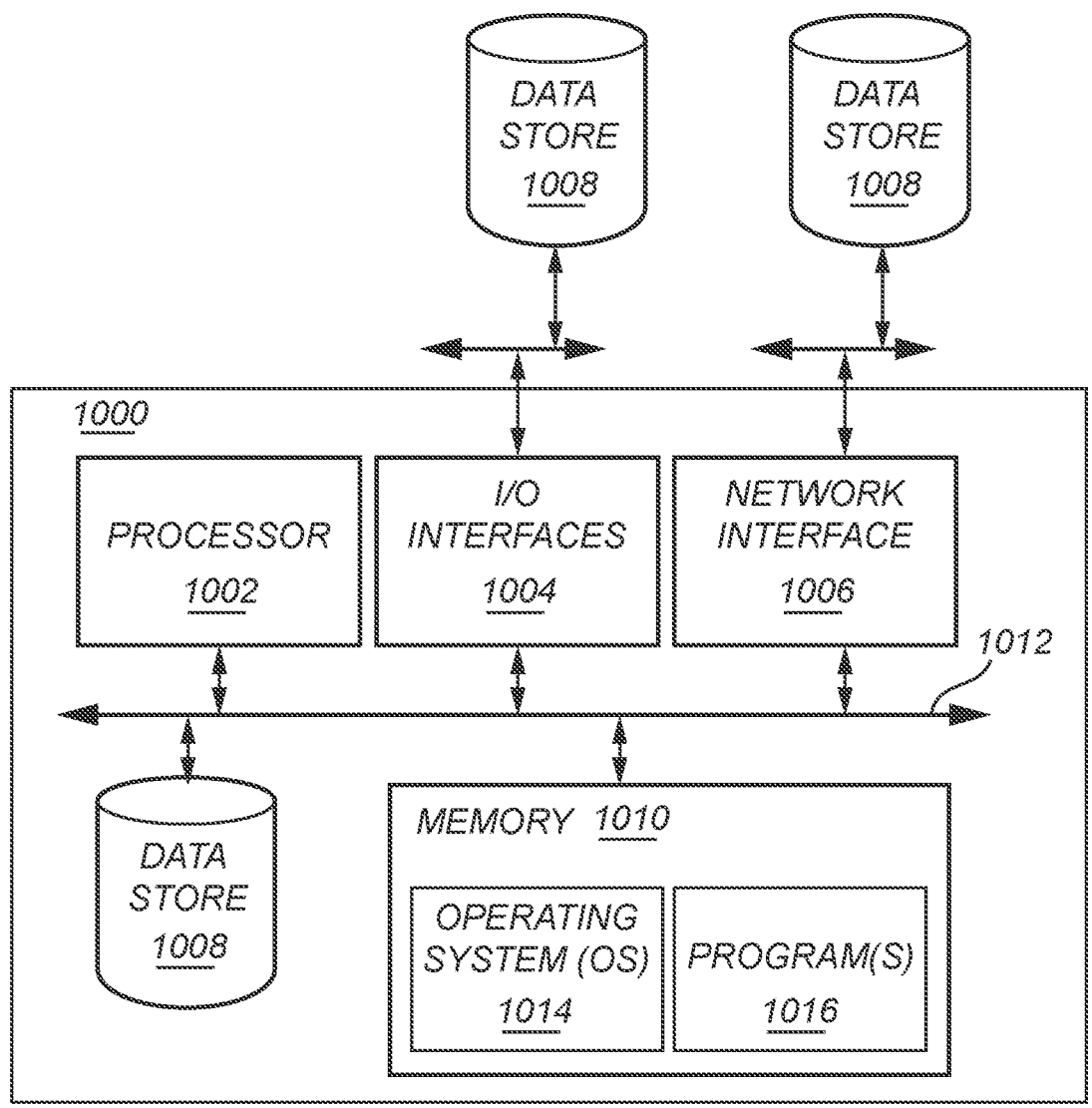
FIG. 10 illustrates a schematic diagram of an exemplary embodiment of a server which may be used in the cloud-based system of FIG. 9 or stand-alone, in accordance with aspects of the present subject matter.

FIG. 9 is a network diagram of a cloud-based system 900 for implementing various cloud-based services of the present disclosure. The cloud-based system 900 includes one or more cloud nodes (CNs) 902 communicatively coupled to the Internet 904 or the like. The cloud nodes 902 may be implemented as a server 1000 (as illustrated in FIG. 10) or the like and can be geographically diverse from one another, such as located at various data centers around the country or globe. Further, the cloud-based system 900 can include one or more central authority (CA) nodes 906, which similarly can be implemented as the server 1000 and be connected to the CNs 902. For illustration purposes, the cloud-based system 900 can connect to a regional office 910, headquarters 920, various employee's homes 930, laptops/desktops 940, and mobile devices 950, each of which can be communicatively coupled to one of the CNs 902. These locations 910, 920, and 930, and devices 940 and 950 are shown for illustrative purposes, and those skilled in the art will recognize there are various access scenarios to the cloud-based system 900, all of which are contemplated herein. The devices 940 and 950 can be so-called road warriors, i.e., users off-site, on-the-road, etc. The cloud-based system 900 can be a private cloud, a public cloud, a combination of a private cloud and a public cloud (hybrid cloud), or the like.

Again, the cloud-based system 900 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 910, 920, and 930 and devices 940 and 950. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 900 is replacing the conventional deployment model. The cloud-based system 900 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 900 is illustrated herein as one example embodiment of a cloud-based system, and those of ordinary skill in the art will recognize the systems and methods described herein are not necessarily limited thereby.

FIG. 10 is a block diagram of a server 1000, which may be used in the cloud-based system 900 (FIG. 9), in other systems, or stand-alone. For example, the CNs 902 (FIG. 9) and the central authority nodes 906 (FIG. 9) may be formed as one or more of the servers 1000. The server 1000 may be a digital computer that, in terms of hardware architecture, generally includes a processor 1002, input/output (I/O) interfaces 1004, a network interface 1006, a data store 1008, and memory 1010. It should be appreciated by those of ordinary skill in the art that FIG. 10 depicts the server 1000 in an oversimplified manner, and a practical embodiment may include additional components and suitably configured processing logic to support known or conventional operating features that are not described in detail herein. The components (1002, 1004, 1006, 1008, and 1010) are communicatively coupled via a local interface 1012. The local interface 1012 may be, for example, but is not limited to, one or more buses or other wired or wireless connections, as is known in the art. The local interface 1012 may have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may be any custom made or commercially available processor, a central processing unit (CPU), an auxiliary processor among several processors associated with the server 1000, a semiconductor-based microprocessor (in the form of a microchip or chipset), or generally any device for executing software instructions. When the server 1000 is in operation, the processor 1002 is configured to execute software stored within the memory 1010, to communicate data to and from the memory 1010, and to generally control operations of the server 1000 pursuant to the software instructions. The I/O interfaces 1004 may be used to receive user input from and/or for providing system output to one or more devices or components.

The network interface 1006 may be used to enable the server 1000 to communicate on a network, such as the Internet 904 (FIG. 9). The network interface 1006 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 1006 may include address, control, and/or data connections to enable appropriate communications on the network. A data store 1008 may be used to store data. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media. In one example, the data store 1008 may be located internal to the server 1000, such as, for example, an internal hard drive connected to the local interface 1012 in the server 1000. Additionally, in another embodiment, the data store 1008 may be located external to the server 1000 such as, for example, an external hard drive connected to the I/O interfaces 1004 (e.g., a SCSI or USB connection). In a further embodiment, the data store 1008 may be connected to the server 1000 through a network, such as, for example, a network-attached file server.

The memory 1010 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 1010 may incorporate electronic, magnetic, optical, and/or other types of storage media. Note that the memory 1010 may have a distributed architecture, where various components are situated remotely from one another but can be accessed by the processor 1002. The software in memory 1010 may include one or more software programs, each of which includes an ordered listing of executable instructions for implementing logical functions. The software in the memory 1010 includes a suitable operating system (O/S) 1014 and one or more programs 1016. The operating system 1014 essentially controls the execution of other computer programs, such as the one or more programs 1016, and provides scheduling, input-output control, file and data management, memory management, and communication control and related services. The one or more programs 1016 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 11:
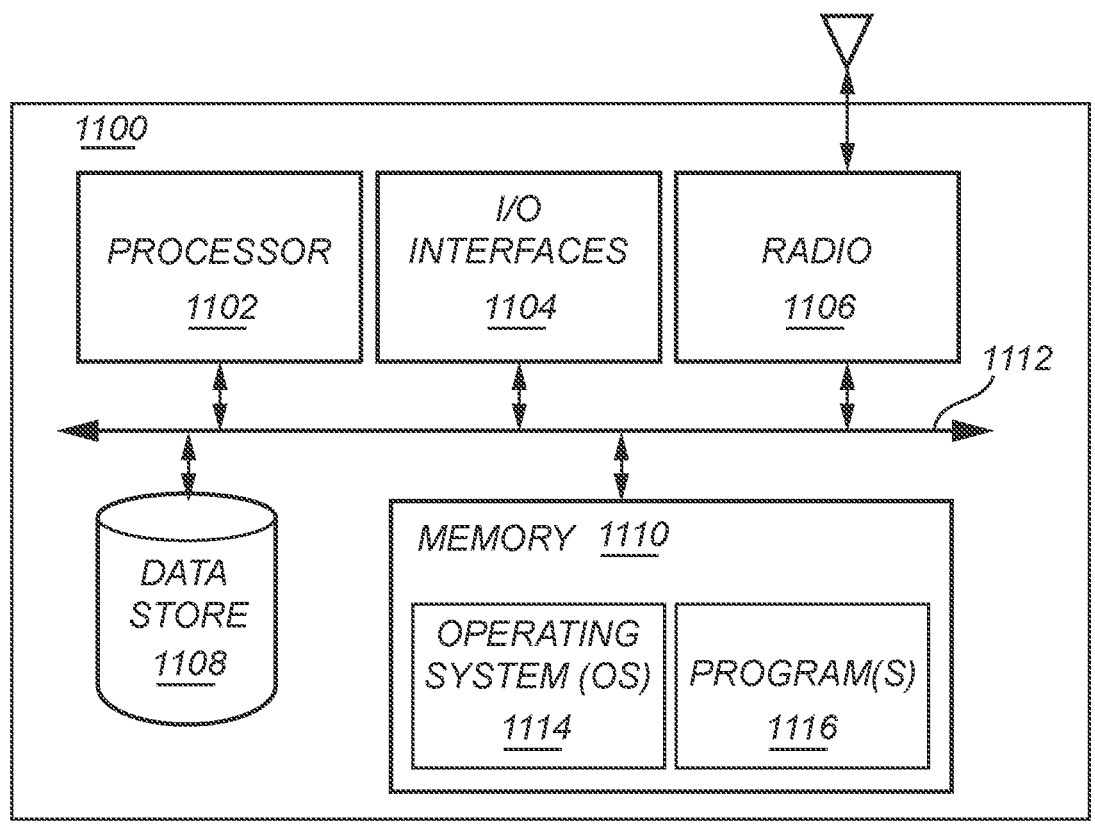
FIG. 11 illustrates a schematic diagram of an exemplary embodiment of a user device which may be used in the cloud-based system of FIG. 9 or stand-alone, in accordance with aspects of the present subject matter.

FIG. 11 is a block diagram of a user device 1100, which may be used in the cloud-based system 900 (FIG. 9), as part of a network, or stand-alone. Again, the user device 1100 can be a vehicle (e.g., one or more control units thereof), a smartphone, a tablet, a smartwatch, an Internet of Things (IoT) device, a laptop, a virtual reality (VR) headset, etc. The user device 1100 can be a digital device that, in terms of hardware architecture, generally includes a processor 1102, I/O interfaces 1104, a radio 1106, a data store 1108, and memory 1110. It should be appreciated by those of ordinary skill in the art that FIG. 11 depicts the user device 1100 in an oversimplified manner, and a practical embodiment may include additional components and suitably configured processing logic to support known or conventional operating features that are not described in detail herein. The components (1102, 1104, 1106, 1108, and 1110) are communicatively coupled via a local interface 1112. The local interface 1112 can be, for example, but is not limited to, one or more buses or other wired or wireless connections, as is known in the art. The local interface 1112 can have additional elements, which are omitted for simplicity, such as controllers, buffers (caches), drivers, repeaters, and receivers, among many others, to enable communications. Further, the local interface 1112 may include address, control, and/or data connections to enable appropriate communications among the aforementioned components.

The processor 1102 is a hardware device for executing software instructions. The processor 1102 can be any custom made or commercially available processor, a CPU, an auxiliary processor among several processors associated with the user device 1100, a semiconductor-based microprocessor (in the form of a microchip or chipset), or generally any device for executing software instructions. When the user device 1100 is in operation, the processor 1102 is configured to execute software stored within the memory 1110, to communicate data to and from the memory 1110, and to generally control operations of the user device 1100 pursuant to the software instructions. In an embodiment, the processor 1102 may include a mobile optimized processor such as optimized for power consumption and mobile applications. The I/O interfaces 1104 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 1106 enables wireless communication to an external access device or network. Any number of suitable wireless data communication protocols, techniques, or methodologies can be supported by the radio 1106, including any protocols for wireless communication. The data store 1108 may be used to store data. The data store 1108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1108 may incorporate electronic, magnetic, optical, and/or other types of storage media.

Again, the memory 1110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1110 may incorporate electronic, magnetic, optical, and/or other types of storage media. Note that the memory 1110 may have a distributed architecture, where various components are situated remotely from one another, but can be accessed by the processor 1102. The software in memory 1110 can include one or more software programs, each of which includes an ordered listing of executable instructions for implementing logical functions. In the example of FIG. 11, the software in the memory 1110 includes a suitable operating system 1114 and programs 1116. The operating system 1114 essentially controls the execution of other computer programs and provides scheduling, input-output control, file and data management, memory management, and communication control and related services. The programs 1116 may include various applications, add-ons, etc. configured to provide end user functionality with the user device 1100. For example, example programs 1116 may include, but not limited to, a web browser, social networking applications, streaming media applications, games, mapping and location applications, electronic mail applications, financial applications, and the like. In a typical example, the end-user typically uses one or more of the programs 1116 along with a network, such as the cloud-based system 900 (FIG. 9).

As explained above, past seat belt assemblies and associated buckles may present challenges for an occupant to reach or manually operate the buckle. For example, occupants that are one or more of a minor, a pet, incapacitated, or have a physical disability may find it difficult or impossible to manually operate a buckle of a seat belt to unlock the latch and associated seat belt webbing from the buckle. While such an occupant may receive help from another occupant (e.g., an operator, guardian, owner, or the like) of the vehicle in unlocking the buckle of the seat belt, the other operator may also have difficulty reaching over the occupant in question (e.g., pet, minor, etc.) in a seat to manually unlock the associated buckle. These challenges may be particularly applicable if the other occupant assisting the occupant in question also suffers from temporary and/or permanent conditions that increase the difficulty of helping the occupant in question operate his/her/its seat belt buckle. For instance, a parent or guardian suffering from a permanent or temporary injury and/or disability may find it extremely challenging or impossible to reach over a child in a seat to manually unlock the associated buckle.

Such an occupant may additionally or alternatively have difficulty to or is unable to manually pull the latch from the associated buckle and/or pull the seat belt webbing(s) across his/her/its body to a sufficient degree to allow the seat belt webbing(s) to retract within the seat belt retractor(s). Similarly, such an occupant may also or alternatively may find it difficult to or is unable to pull the seat belt webbing(s) from the seat belt retractor(s), pull the seat belt webbing(s) across his/her/its body to a sufficient degree to allow insertion of the latch within the associated buckle. Furthermore, the other occupant aiding the occupant may also find it difficult or impossible to assist in extending and retracting the seat belt webbing(s) and latch.

As explained above, occupants of vehicles and/or other occupants, assistants, etc. may find it difficult to lock and unlock buckles of seat belt assemblies and to retract associated seat belt webbings and latches from across an occupant requiring or desiring assistance with the same. Thus, aspects of the present disclosure are directed to configurable buckle apparatuses including associated locking mechanisms and/or retention mechanisms. A buckle apparatus including a locking mechanism, as described herein, may allow for the latch of the seat belt assembly to be selectively locked within the associated buckle. Some such buckle apparatuses or alternatively configured buckle apparatuses including a retention mechanism, as described herein, may allow for the latch of the seat belt assembly to be selectively retained within the associated buckle. Furthermore, aspects of the present subject matter are directed to systems for controlling such buckle apparatuses, locking mechanism, and/or retention mechanisms based on the status of the vehicle (e.g., satisfaction of one or more prerequisite conditions), as described herein.

Aspects of the present subject matter are further or alternatively directed to systems for operating a configurable buckle apparatus based on the occupant in question. For example, such a system may include an occupant type identification module for identifying the occupant's status as an assisted occupant (an occupant requiring or desiring assistance locking or unlocking the buckle apparatus) or an unassisted occupant (an occupant not requiring or desiring assistance locking or unlocking the buckle apparatus). Such a system for operating the configurable buckle apparatus may further include a locking mechanism control module for operating the locking mechanism of the buckle apparatus for occupants determined to be assisted occupants. For example, the locking mechanism control module may control the locking mechanism of the buckle apparatus based on the status of the occupant as an assisted occupant and on the status of the vehicle (e.g., satisfaction of one or more prerequisite conditions), as described herein.

In some such systems, the occupant type identification module may further identify the occupant's status as retained occupant (an occupant requiring or desiring assistance retracting the seat belt latch and/or webbing from the associated buckle) or an unretained occupant (an occupant not requiring or desiring assistance retracting the seat belt latch and/or webbing from the associated buckle). Such a system for operating the configurable buckle apparatus may further include a retention mechanism control module for operating the retention mechanism of the buckle apparatus for occupants determined to be retained occupants. For example, the retention mechanism control module may control the retention mechanism of the buckle apparatus based on the status of the occupant as a retained occupant and on the status of the vehicle (e.g., satisfaction of one or more prerequisite retention conditions), as described herein.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A buckle apparatus for a seat of a vehicle, the buckle apparatus comprising:
a locking mechanism arranged within a casing and configured to operably engage with a latch coupled to a seat belt webbing of the vehicle such that, in a locked mode, the latch is secured within an insertion slot defined in the casing, and, in an unlocked mode, the latch is removable from the insertion slot of the casing; and
a retention mechanism arranged within the casing and operable with the latch such that, in a retention mode, the retention mechanism is configured to cause the latch to be retained within the insertion slot of the casing when a withdrawal force applied to the latch is less than a predetermined value.

2. The buckle apparatus of claim 1, wherein, when the retention mechanism is in the retention mode and the locking mechanism is in the unlocked mode, the retention mechanism is configured to allow the latch to withdraw from the insertion slot of the casing when the withdrawal force applied to the latch is greater than the predetermined value.

3. The buckle apparatus of claim 1, wherein the retention mechanism is configured to, in response to an electrical signal communicated to the retention mechanism, transition from the retention mode to a release mode, in which the retention mechanism is configured to allow the latch to withdraw from the insertion slot of the casing when the withdrawal force applied to the latch is less than the predetermined value and the locking mechanism is in the unlocked mode.

4. The buckle apparatus of claim 3, further comprising:
a release element at least partially arranged within the casing and mechanically coupled with each of the locking mechanism and the retention mechanism, wherein the release element is selectable to transition the locking mechanism from the locked mode to the unlocked mode and to transition the retention mechanism from the retention mode to the release mode.

5. The buckle apparatus of claim 3, further comprising:
a retention actuator operably coupled with the retention mechanism and configured to transition the retention mechanism from the retention mode to the release mode in response to the electrical signal communicated to the retention mechanism, and wherein the retention actuator is further configured to transition the retention mechanism from the release mode to the retention mode in response to a different electrical signal communicated to the retention mechanism.

6. The buckle apparatus of claim 1, wherein the locking mechanism is configured to, in response to an electrical signal communicated to the locking mechanism, transition from the locked mode to the unlocked mode.

7. The buckle apparatus of claim 6, further comprising:
a locking actuator operably coupled with the locking mechanism and configured to transition the locking mechanism from the locked mode to the unlocked mode in response to the electrical signal communicated to the locking mechanism, and wherein the locking actuator is further configured to transition the locking mechanism from the unlocked mode to the locked mode in response to a different electrical signal communicated to the locking mechanism.

8. An occupant restraint system for a vehicle, the occupant restraint system comprising:
at least one buckle apparatus, each at least one buckle apparatus associated with a seat of the vehicle and including:
a locking mechanism configured to operably engage with a latch coupled to a seat belt webbing associated with the seat and such that, in a locked mode, the latch is secured to the locking mechanism, and, in an unlocked mode, the latch is removable from the locking mechanism, and
a retention mechanism operable with the latch such that, in a retention mode, the retention mechanism is configured to cause the latch to be retained by the buckle apparatus when a withdrawal force applied to the latch is less than a predetermined value.

9. The occupant restraint system of claim 8, wherein, when the retention mechanism is in the retention mode and the locking mechanism is in the unlocked mode, the retention mechanism is configured to allow removal of the latch from the buckle apparatus when the withdrawal force applied to the latch is greater than the predetermined value.

10. The occupant restraint system of claim 8, further comprising:
a control unit communicatively coupled to the at least one buckle apparatus, the control unit configured to, in response to a communication indicative that at least one prerequisite condition associated with the at least one buckle apparatus has been satisfied, communicate a signal to a locking actuator of the associated locking mechanism to cause the associated locking mechanism to transition from the locked mode to the unlocked mode.

11. The occupant restraint system of claim 10, wherein the at least one prerequisite condition comprises at least one of a transmission of the vehicle being transitioned to a park setting, the vehicle being transitioned from an on setting to an off setting, a door associated with an operator's seat of the vehicle being opened, a door associated with the at least one buckle apparatus being opened, the door associated with the at least one buckle apparatus being approached by another occupant of the vehicle, the door associated with the at least one buckle apparatus having a child-lock mode engaged, selecting the unlocked mode for the associated locking mechanism of the at least one buckle apparatus via an infotainment unit associated with the vehicle, or a determination that the occupant restraint system for the vehicle may be safely disengaged.

12. The occupant restraint system of claim 10, wherein the control unit is further configured to communicate a different signal to the locking actuator of the associated locking mechanism to cause the locking mechanism to transition from the unlocked mode to the locked mode in response to a communication indicative of at least one of a transmission of the vehicle being transitioned to a setting other than park, a door associated with an operator's seat of the vehicle being closed, a door associated with the at least one buckle apparatus being closed, selecting the locked mode for the associated locking mechanism of the at least one buckle apparatus via an infotainment unit associated with the vehicle, or the door associated with the at least one buckle apparatus having a child-lock mode engaged.

13. The occupant restraint system of claim 10, wherein the retention mechanism is configured to, in a release mode, allow removal of the latch from the buckle apparatus when the withdrawal force applied to the latch is less than the predetermined value and the locking mechanism is in the unlocked mode, and wherein the control unit is further configured to, in response to a communication indicative that at least one prerequisite retention condition associated with the at least one buckle apparatus has been satisfied, communicate a signal to a retention actuator of the associated retention mechanism to cause the associated retention mechanism to transition from the retention mode to the release mode.

14. The occupant restraint system of claim 13, wherein the at least one prerequisite retention condition comprises at least one of a door associated with an operator's seat of the vehicle being opened, a door associated with the at least one buckle apparatus being opened, the door associated with the at least one buckle apparatus being approached by another occupant of the vehicle, the door associated with the at least one buckle apparatus having a child-lock mode engaged, or selecting the release mode for the associated retention mechanism of the at least one buckle apparatus via an infotainment unit associated with the vehicle.

15. The occupant restraint system of claim 13, wherein the control unit is further configured to communicate a different signal to the retention actuator of the associated retention mechanism to cause the associated retention mechanism to transition from the release mode to the retention mode in response to a communication indicative of at least one of selecting the retention mode for the associated retention mechanism of the at least one buckle apparatus via an infotainment unit associated with the vehicle, the vehicle being transitioned from an off setting to an on setting, a transmission of the vehicle being transitioned to a setting other than park, a door associated with an operator's seat of the vehicle being closed, a door associated with the at least one buckle apparatus being closed, or the door associated with the at least one buckle apparatus being in a child-lock mode.

16. The occupant restraint system of claim 13, further comprising:
at least one seat belt retractor, each seat belt retractor associated with one of the at least one buckle apparatus and configured to apply tension to the seat belt webbing of the associated seat, the tension applied by each seat belt retractor suitable to remove the associated latch from the associated buckle apparatus when the associated retention mechanism is in the release mode.

17. A non-transitory computer-readable medium comprising instructions stored in at least one memory that, when executed by one or more processors, cause the one or more processors to carry out steps comprising:
determining that at least one prerequisite condition associated with at least one buckle apparatus of an occupant restraint system has been satisfied; and
communicating, in response to the determination that the at least one prerequisite condition associated with the at least one buckle apparatus has been satisfied, a signal to a locking mechanism of each of the at least one buckle apparatus determined to satisfy the at least one prerequisite condition and causing the locking mechanism to transition from a locked mode, in which a latch coupled to a seat belt webbing associated with the buckle apparatus is secured to the locking mechanism, to an unlocked mode, in which the latch is removable from the locking mechanism,
wherein each of the at least one buckle apparatus includes a retention mechanism operable with the latch such that, in a retention mode, the retention mechanism is configured to cause the latch to be retained by the buckle apparatus when a withdrawal force applied to the latch is less than a predetermined value, and wherein, when the retention mechanism is in the retention mode and the locking mechanism is in the unlocked mode, the retention mechanism is configured to allow removal of the latch from the buckle apparatus when the withdrawal force applied to the latch is greater than the predetermined value.

18. The non-transitory computer-readable medium of claim 17, wherein the steps further comprise:
communicating a different signal to the locking mechanism of the at least one buckle apparatus to cause the locking mechanism to transition from the unlocked mode to the locked mode in response to a communication indicative that at least one of a transmission of a vehicle being transitioned to a setting other than park, a door associated with an operator's seat of the vehicle being closed, a door associated with the at least one buckle apparatus being closed, selecting the locked mode for the locking mechanism of the at least one buckle apparatus via an infotainment unit associated with the vehicle, or the door associated with the at least one buckle apparatus having the child-lock mode engaged.

19. The non-transitory computer-readable medium of claim 17, wherein the steps further comprise:
determining that at least one prerequisite retention condition associated with the at least one buckle apparatus has been satisfied; and
communicating, in response to the determination that the at least one prerequisite retention condition associated with the at least one buckle apparatus has been satisfied, a signal to the retention mechanism of each of the at least one buckle apparatus determined to satisfy the at least one prerequisite retention condition and causing the retention mechanism to transition from the retention mode to a release mode, in which the retention mechanism is configured to allow the latch to withdraw from the buckle apparatus when the withdrawal force applied to the latch is less than the predetermined value and the locking mechanism is in the unlocked mode.

20. The non-transitory computer-readable medium of claim 19, wherein the steps further comprise:
communicating a different signal to the retention mechanism of the at least one buckle apparatus to cause the retention mechanism to transition from the release mode to the retention mode in response to a communication indicative of one or more of selecting the retention mode for the retention mechanism of the at least one buckle apparatus via an infotainment unit associated with the vehicle, the vehicle being transitioned from an off setting to an on setting, a transmission of the vehicle being transitioned to a setting other than park, a door associated with an operator's seat of the vehicle being closed, a door associated with the at least one buckle apparatus being closed, or the door associated with the at least one buckle apparatus having the child-lock mode engaged.

* * * * *